United States Patent
Zhao

(10) Patent No.: US 12,546,378 B2
(45) Date of Patent: Feb. 10, 2026

(54) COUPLED-BEAM ENERGY HARVESTING DAMPER

(71) Applicant: Xingzhuang Zhao, College Park, MD (US)

(72) Inventor: Xingzhuang Zhao, College Park, MD (US)

( * ) Notice: Subject to any disclaimer, the term of this patent is extended or adjusted under 35 U.S.C. 154(b) by 0 days.

(21) Appl. No.: 19/325,611

(22) Filed: Sep. 11, 2025

(65) Prior Publication Data

US 2025/0389312 A1    Dec. 25, 2025

(51) Int. Cl.
| | |
|---|---|
| H02K 35/02 | (2006.01) |
| F16F 13/00 | (2006.01) |
| F16F 15/02 | (2006.01) |
| F16F 15/03 | (2006.01) |
| H02K 33/18 | (2006.01) |
| E04B 1/98 | (2006.01) |

(52) U.S. Cl.
CPC ............ *F16F 15/022* (2013.01); *F16F 13/00* (2013.01); *H02K 33/18* (2013.01); *E04B 1/98* (2013.01); *F16F 2222/06* (2013.01); *F16F 2226/04* (2013.01)

(58) Field of Classification Search
CPC .......... F16F 15/022; F16F 13/00; F16F 15/03; F16F 2222/06; F16F 2226/04; E04B 1/98; H02K 33/18; H02K 35/02
See application file for complete search history.

(56) References Cited

U.S. PATENT DOCUMENTS

| | | | |
|---|---|---|---|
| 7,439,657 B2 | 10/2008 | Clingman | |
| 7,569,952 B1 | 8/2009 | Bono | |
| 7,667,375 B2 | 2/2010 | Berkcan | |
| 7,898,157 B2 | 3/2011 | Churchill | |
| 7,913,783 B2 * | 3/2011 | Elmaleh | B60K 25/00 310/24 |
| 8,022,563 B2 | 9/2011 | Lemieux | |
| 8,067,849 B2 | 11/2011 | Stewart | |
| 8,072,122 B2 | 12/2011 | Gao | |
| 8,222,754 B1 | 7/2012 | Soliman | |
| 8,441,172 B2 | 5/2013 | Zhang | |
| 8,664,827 B2 | 3/2014 | Uesugi | |
| 8,796,907 B2 | 8/2014 | Galchev | |
| 8,866,316 B2 | 10/2014 | Wood | |
| 9,095,716 B2 | 8/2015 | Makdissi | |
| 9,624,900 B2 | 4/2017 | Phillips | |
| 10,033,305 B2 | 7/2018 | Sun | |

(Continued)

*Primary Examiner* — Thomas W Irvin

(57) ABSTRACT

A coupled-beam energy harvesting damper (CBEHD) is disclosed. The device includes a support structure, at least one coil-bearing beam, and at least two magnet-bearing beams positioned adjacent the coil-bearing beam. One or more coils wound on a coil spool are secured along the coil-bearing beam, and at least one magnet assembly—including a permanent magnet within a housing pipe—spans between adjacent magnet-bearing beams and passes through a bore of at least one coil spool. Relative motion between the beams under external excitation induces an electromotive force (EMF) in the coils, thereby converting vibrational energy into electrical power. The CBEHD may operate as an energy harvester, a vibration damper, or both. Arrays or containerized systems of CBEHDs provide scalable, multi-directional deployment across structural and fluid-interactive environments.

18 Claims, 22 Drawing Sheets

(56) References Cited

U.S. PATENT DOCUMENTS

| | | |
|---|---|---|
| 10,197,040 B2 | 2/2019 | Abdelkhalik |
| 10,224,835 B1 | 3/2019 | Singh |
| 10,644,579 B2 | 5/2020 | Nerubenko |
| 10,985,633 B2 | 4/2021 | Shahosseini |
| 11,536,241 B2 | 12/2022 | Qu |
| 11,545,917 B2 | 1/2023 | Purol |
| 11,905,918 B2 * | 2/2024 | Chopra ................ F03B 13/16 |
| 12,003,197 B2 | 6/2024 | Haronian |
| 12,068,664 B1 * | 8/2024 | Kipnis ................ H02K 7/1869 |
| 2002/0172060 A1 * | 11/2002 | Takeuchi ............. H02K 35/00 363/110 |
| 2007/0024126 A1 * | 2/2007 | Brennvall ............ F04B 35/045 310/14 |
| 2008/0296984 A1 * | 12/2008 | Honma ................ H02K 35/02 310/17 |
| 2013/0127175 A1 * | 5/2013 | Zuo ...................... B60G 13/14 290/1 A |
| 2015/0145258 A1 * | 5/2015 | Phillips ............... H02K 35/02 248/610 |

* cited by examiner

COUPLED-BEAM ENERGY HARVESTING DAMPER

FIELD OF THE INVENTION

The present disclosure generally relates to devices and systems for harnessing and managing vibratory energy. More particularly, the disclosure pertains to coupled-beam energy harvesting dampers configured to convert vibration energy into electrical power, to provide vibration damping, or to perform both functions concurrently.

BACKGROUND OF THE INVENTION

Vibration is a pervasive phenomenon encountered in structural, mechanical, and fluid-interactive systems. Over the past two decades, substantial research has been devoted to vibration energy harvesting, i.e., the conversion of ambient vibratory motion into usable electrical energy. Electromagnetic, piezoelectric, and electrostatic harvesters are known in the art; however, such devices frequently exhibit low efficiency at low frequencies, narrow operational bandwidths, and limited scalability for large-scale deployment. Moreover, many existing designs are constrained by rigid geometries that cannot be readily tuned or adapted to diverse excitation sources, such as wind-induced oscillations, ocean waves, or machinery vibrations.

In parallel, extensive development has also been directed to vibration control technologies aimed at suppressing or mitigating undesired vibrations. Conventional approaches—such as tuned mass dampers, viscoelastic layers, and passive spring-damper systems—have been widely implemented. While such solutions may be effective in certain contexts, they typically suffer from relatively narrow frequency response, lack of adaptability to variable or multi-modal excitation, and a complete inability to recover useful energy from the vibratory environment.

There remains a need for improved devices and systems that can harvest vibrational energy, provide vibration damping, or accomplish both simultaneously. Preferably, such devices or systems are configured to operate across multiple frequency bands, to be structurally scalable from small-scale implementations to large-scale deployments, and to adopt a modular architecture that supports both standalone use and integration into array-based systems. There is a further need for adaptable systems capable of deployment across diverse operational environments, including structural members, mechanical housings, offshore platforms, wind-exposed bodies, and floating or submerged marine structures.

The present disclosure addresses these long-standing challenges by providing a coupled-beam energy harvesting damper that integrates the dual functions of renewable energy generation and vibration suppression within a modular, tunable, and scalable framework.

SUMMARY OF THE INVENTION

The present disclosure is directed to a coupled-beam energy harvesting damper (CBEHD) and, more particularly, to devices and systems configured to convert vibration energy into electrical power, to provide vibration damping, or to perform both functions concurrently across a broad frequency spectrum.

In exemplary embodiments, a CBEHD comprises a support structure, at least one coil-bearing beam, and at least two magnet-bearing beams positioned in operative proximity to the coil-bearing beam. At least one coil is wound about a coil spool secured along the coil-bearing beam, while at least one magnet assembly—including at least one permanent magnet, a housing pipe, and, in certain embodiments, optional spacers and/or a pipe cap—extends between adjacent magnet-bearing beams and passes through a bore of at least one coil spool with at least one electrical coil wound thereabout. When the CBEHD is subjected to external excitation, such as vibration, oscillation, or wave-induced motion, relative displacement between the coil-bearing and magnet-bearing beams induces an electromotive force (EMF) in the coils. In this manner, the CBEHD enables efficient conversion of mechanical energy into electrical energy.

To enhance tunability and stability, the CBEHD may further include auxiliary components such as coupling springs, anti-collision cables, tuning masses, and side supports. These components may act individually or in concert to regulate beam displacement, ensure structural stability, and broaden the effective operating frequency bandwidth. In certain embodiments, the beams may be realized as modular assemblies composed of beam units joined by beam connectors, thereby allowing tailored dynamic response in different applications. In alternative embodiments, the beams may be fabricated as continuous, unitary members for improved structural integrity and simplified manufacturing and installation. Coils and magnet assemblies may be selectively incorporated, omitted, or repositioned along particular connectors or beam segments, thereby allowing designers to balance energy harvesting performance, damping capacity, and system complexity according to specific application requirements.

The disclosure further contemplates multiple tuning strategies for adjusting natural frequencies and vibration mode shapes. Such tuning may be achieved by modifying one or more structural parameters, including beam length, beam stiffness, beam material, beam boundary conditions, coupling-spring stiffness, magnet weight, magnet placement, coil weight, coil placement, tuning-mass weight, and tuning-mass placement. As a result, the CBEHD may be optimized for broadband operation under variable or stochastic environmental conditions.

In some embodiments, a plurality of CBEHD units may be deployed in arrays or integrated into containerized systems. Such systems may be secured to or embedded within host vibrating structures, suspended in air, submerged in liquid, or deployed on the surface of a water body. CBEHD units within an array may be oriented along different spatial directions and/or tuned to one or more natural frequencies, thereby achieving broadband frequency coverage, enhanced damping performance, and/or scalable energy generation. Containerized systems further facilitate transportation, installation, maintenance, and replacement.

The present invention provides a modular, tunable, and scalable platform configured to perform energy harvesting, vibration damping, or both simultaneously. The disclosed CBEHD technology is adaptable to a wide range of structural, mechanical, and environmental applications, including but not limited to buildings, bridges, vehicles, offshore platforms, machinery, and wave-energy installations.

DETAILED DESCRIPTION OF THE EMBODIMENTS

Figure 1A:
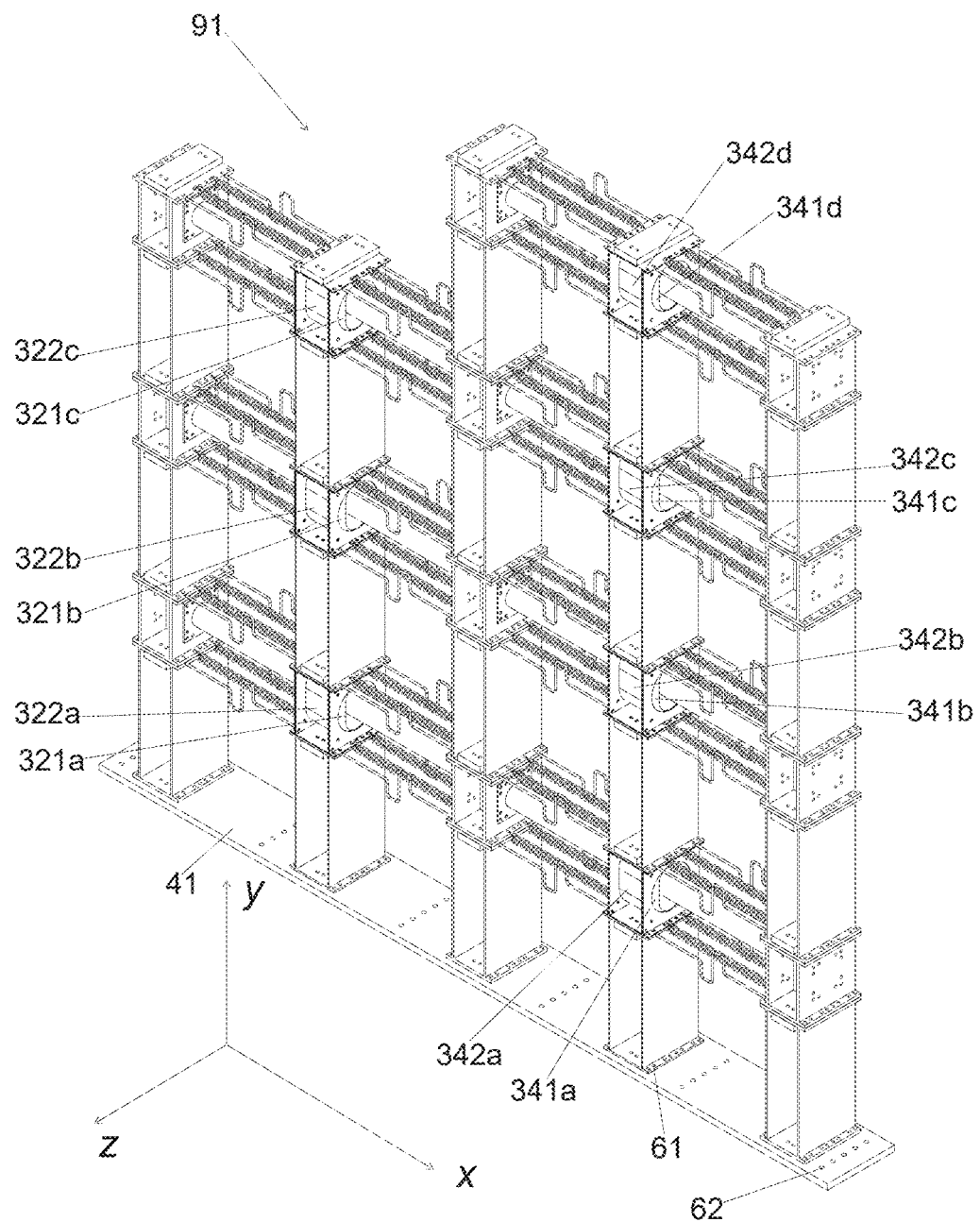
FIG. 1A is a schematic perspective view illustrating a representative configuration of a coupled-beam energy harvesting damper (CBEHD) in accordance with the present disclosure.

The present disclosure relates to coupled-beam energy harvesting dampers ("CBEHDs") and to methods for tuning such devices and associated systems. In various embodiments, the disclosed CBEHDs are configured for applications in which vibrational energy, fluid-induced energy, or both, are to be harvested, dissipated, or simultaneously harvested and dissipated.

The following detailed description is provided to enable one of ordinary skill in the art to make and use the invention and is not intended to limit the scope of the claims. The foregoing summary, as well as the following detailed description of one or more embodiments, will be better understood when read in conjunction with the accompanying drawings. As will be appreciated, like reference numerals denote like elements throughout the drawings, irrespective of variations in size, shape, material, or configuration illustrated in different embodiments. For clarity, not every element is labeled in every figure. However, each reference numeral used in the drawings is introduced and described at least once in the following Detailed Description.

As used herein, an element or feature recited in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property may further include additional elements or features not having that particular property. Also, it will be appreciated that the terms "comprises", "has", and "includes" mean "including but not limited to" and the terms "comprising", "having", and "including" have equivalent meanings.

As used herein, the term "and/or" can include any and all combinations of one or more of the associated listed elements or features.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual.

As used herein, the term "configured" denotes an actual state of configuration that fundamentally ties the element or feature to the physical characteristics of the element or feature preceding the phrase "configured to."

As used herein, the term "beam" generally refers to an elongated structural member capable of sustaining vibratory motion and bending deformation. Unless otherwise specified, the term encompasses members of uniform or non-uniform lengths, members of uniform or non-uniform cross-sections, members incorporating attached concentrated masses, and members formed as either a continuous unitary element or as multiple units joined by connectors. For example, beams may be designed with identical lengths for symmetry, or intentionally varied lengths to achieve tailored stiffness distributions, broadened frequency response, or enhanced energy dissipation characteristics. In accordance with structural vibration theory, such beams exhibit a plurality of natural frequencies and associated mode shapes. This definition is intended to be illustrative and non-limiting, and is to be understood in the context of the embodiments described herein.

As used herein, the term "rigid" with reference to a beam denotes a structural member that is substantially non-deformable under the operational loads contemplated for the disclosed device. A "rigid" beam maintains its geometric shape without appreciable elastic deflection, bending, or twisting during normal operation, and thereby provides a stable support or reference frame relative to which other, more flexible or deformable beams may undergo vibratory motion. In this context, "rigid" does not necessarily imply absolute inflexibility in a physical sense, but rather denotes that any deflection or compliance is negligible for purposes of the device's energy harvesting and/or damping functionality.

It will be understood by those of ordinary skill in the art that, unless otherwise specified, the term "stiffness" as used herein refers to bending stiffness, i.e., the resistance of a beam or structural member to deformation under applied bending forces.

As used herein, the terms "coil-bearing beam" and "magnet-bearing beam" are functional designations; in alternative embodiments, their functional roles may be interchanged.

As used herein, the terms "coil spool" and "magnet assembly" are functional designations; in alternative embodiments, their functional roles may be interchanged.

As used herein, the terms "host vibrating structure" and "host vibrating body" refer to any natural or man-made object capable of undergoing oscillatory, vibratory, or wave-induced motion in fluid or non-fluid environments, to which a CBEHD or a system thereof may be secured. Examples of host vibrating structures include, without limitation, bridges, buildings, offshore platforms, vehicles, ships, aircraft, wind turbine towers, pipelines, and other structures or installations subject to environmental, operational, or mechanical vibration or wave excitation. These examples are illustrative and not intended to limit the scope of the term.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with, or "directly contacting" another element or feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the figures. The spatially relative terms can, however, encompass different orientations in use or operation in addition to the orientation depicted in the figures.

Reference herein to "example" means that one or more features, structures, elements, components, characteristics, and/or operational steps described in connection with the example are included in at least one embodiment and/or implementation of the subject matter according to the present disclosure.

Figure 1B:
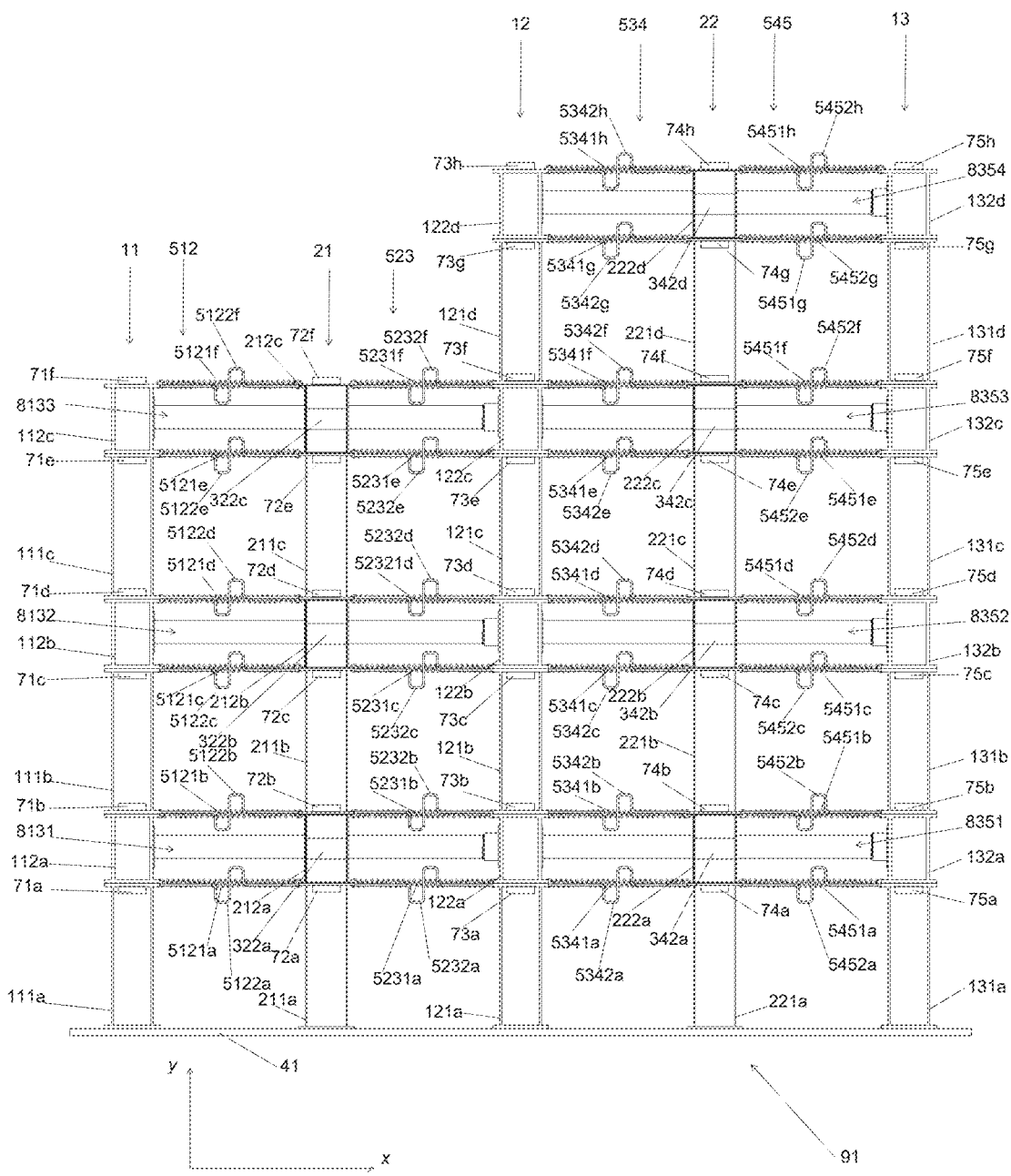
FIG. 1B is a front elevational view of the CBEHD depicted in FIG. 1A, showing the relative arrangement of the beam units, connectors, coupling springs, anti-collision cables, tuning masses, and coil-magnet assemblies.

For clarity of description, the term "longitudinal stiffness" of a beam in a CBEHD refers to the bending stiffness associated with deformation occurring along the longitudinal direction of the magnet housing pipe, which is aligned substantially parallel to the x-axis and generally coincides with the longitudinal axis of the base support structure as depicted in FIGS. 1A and 1B. Conversely, the term "transverse stiffness" of a beam in a CBEHD refers to the bending stiffness associated with deformation along the transverse direction of the base support structure, which is oriented substantially parallel to the z-axis in FIG. 1A.

In general, each CBEHD comprises a combination of structural and functional elements designed to exploit relative motion between magnet-bearing and coil-bearing components. More specifically, a CBEHD may include:

a) A support structure, in one or more embodiments, provided as a separate member specifically designed to be mounted to the host vibrating body. In alternative embodiments, the support structure may be defined integrally by the vibrating body itself.

b) At least two magnet-bearing beams, each beam being a member extending from the support structure. The magnet-bearing beams provide mechanical compliance and define a vibratory path for magnets carried thereby. These beams may be tuned in terms of geometry, material composition, stiffness, mass, length, and boundary conditions to establish natural frequencies tailored to the ambient excitation spectrum.

c) At least one coil-bearing beam, likewise mounted to the support structure, and disposed in proximity to the magnet-bearing beams. The coil-bearing beam is a member with vibration characteristics that differ from those of the magnet-bearing beams and defines a vibratory path for coils carried thereby.

d) At least one electrical coil, wound about a coil spool and affixed to the coil-bearing beam. The coil is configured to generate an electromotive force (EMF) upon exposure to a varying magnetic flux, and is electrically connected via conductive leads to an external circuit or load for energy harvesting and/or energy dissipation. The electrical coil may be realized using any suitable conductive winding or equivalent conductor arrangement. Exemplary implementations include, without limitation, round or rectangular enameled copper wire, aluminum wire with insulating coating, or other metallic conductors possessing high electrical conductivity. In certain embodiments, the coil may alternatively be fabricated using printed traces deposited on a substrate, such as a flexible printed circuit board (FPCB) or rigid laminate, thereby enabling compact geometries and improved integration with structural components. It will be appreciated by one of ordinary skill in the art that the foregoing options are illustrative rather than limiting, and that the coil can be implemented using any conductive medium or fabrication technique suitable for achieving the desired electrical and mechanical performance.

e) At least one magnet assembly, spanning between and coupling the two magnet-bearing beams, passing through the bore of at least one coil that has at least one electrical coil wound thereabout. Each magnet assembly comprises one or more permanent magnets (or, in one or more embodiments, arrays of magnets) arranged to define a magnetic field that interacts with the coil. The magnet assembly is preferably oriented such that relative vibratory motion between the coil-bearing beam and the magnet-bearing beams results in a change in magnetic flux linkage through the coil, thereby inducing an EMF.

In one or more embodiments, the CBEHD may further comprise one or more optional structural and/or functional components, which may be employed individually or in any combination, including but not limited to the following:

a) Coupling Springs. One or more coupling springs operatively disposed between a coil-bearing beam and an adjacent magnet-bearing beam, the coupling springs being configured to provide elastic coupling, modify stiffness, and influence the natural frequencies of the CBEHD. The stiffness of the coupling springs in the CBEHD may be selectively adjusted by applying a preload to the spring, by substituting the spring with another spring having a different stiffness, or by otherwise modifying one or more characteristics of the spring, such as adjusting coil pitch, diameter, or material properties of the spring.

b) Anti-Collision Cables. One or more anti-collision cables positioned between a coil-bearing beam and an adjacent magnet-bearing beam, the cables being arranged to restrict excessive displacement, prevent physical impact or overtravel, and thereby preserve long-term structural integrity of the CBEHD.

c) Tuning Masses. One or more tuning masses mounted to at least one beam structure, the tuning masses being selectively sized and positioned to adjust the effective modal properties of the beam, such as frequency response, mode shape distribution, and vibration amplitude.

d) Auxiliary Side Support Structures. At least one auxiliary side support structure operatively coupled to one or more magnet-bearing beams through a coordinated combination of coupling springs and anti-collision cables, the side support structure being adapted to provide lateral stabilization, maintain alignment, and suppress unwanted vibrational modes of the beams.

These optional components, individually or in combination, are configured to achieve one or more of the following: regulating relative displacement between the coil-bearing and magnet-bearing beams, modifying one or more natural frequencies, suppressing excessive vibration amplitudes to prevent structural overtravel, and maintaining alignment and stability of the beams under varied excitation conditions.

In one or more embodiments, the CBEHD is configured such that coils can selectively operate, depending upon operational conditions or device configuration, in a mode chosen from the following:

a) a pure energy harvesting mode, wherein electrical energy is generated from relative motion between the coil-bearing beam and the magnet-bearing beams and is harvested;

b) a pure damping mode, wherein vibrational energy is dissipated to attenuate oscillatory motion of the host structure; or c) a hybrid mode, wherein energy harvesting and vibration damping are performed concurrently.

In operation, ambient vibrations or fluid flows impart oscillatory energy into the support structure of the CBEHD. This excitation is transmitted to both the magnet-bearing beams and the coil-bearing beam. Because the coil-bearing beam and adjacent magnet-bearing beams are designed with distinct stiffness and mass distributions, they exhibit different vibratory properties, including dissimilar mode shapes and natural frequencies. When the support structure is subjected to external excitation, these beams respond asynchronously, producing guided relative motion between the coil mounted on the coil-bearing beam and the magnet assembly supported by the magnet-bearing beams. This relative motion alters the magnetic flux linkage through the coil, thereby inducing an EMF by electromagnetic coupling. When the coil leads are electrically connected to an external load circuit, the induced EMF provides a mechanism for converting mechanical vibration energy into electrical energy. The generated electricity may be harvested for useful output and/or dissipated to achieve vibration damping of the host vibrating structure. In addition, when the frequency of external excitation approaches one of the natural frequencies of the CBEHD, resonance occurs. Under such conditions, the relative displacement between the coil and magnet assembly is amplified, significantly increasing the rate of flux variation through the coil and thereby enhancing the magnitude of the induced EMF. This resonance-driven amplification enables the CBEHD to achieve high efficiency in energy conversion and/or vibration attenuation within targeted frequency bands. By suitable design and tuning, the CBEHD may be configured to operate efficiently over multiple frequency bands. Furthermore, arrays of CBEHDs may be arranged in series, parallel, or distributed configurations, thereby broadening the effective operational bandwidth and enabling large-scale energy harvesting and/or energy dissipation from complex vibrational or fluid environments.

At steady state, the peak induced EMF developed in a coil is governed by fundamental electromagnetic induction principles and may be approximately expressed in analytical form as $V_{peak}=nAdB/dx\, D_r\omega$, where n denotes the total number of turns of the coil, A represents the effective cross-sectional area enclosed by the coil, dB/dx corresponds to the spatial gradient of the magnetic flux density along the direction of relative motion, $D_r$ is the amplitude of relative displacement between a coil and the associated magnet assembly, and $\omega$ is the angular frequency of vibration. This formulation highlights that the maximum induced voltage is directly proportional to both the electrical and mechanical parameters of the CBEHD. Specifically, the coil geometry (captured through n and A) determines the available flux-linkage capacity, while the magnetic field gradient dB/dx dictates the sensitivity of the system to positional variations. The amplitude of relative displacement $D_r$ and the excitation frequency w further scale the rate of change of flux linkage, thereby amplifying the induced voltage under dynamic conditions. It should be understood that practitioners in the field may equivalently refer to the induced electromotive force as the induced voltage across the coil terminals. Regardless of terminology, the relationship establishes a clear design framework: by tailoring coil parameters, optimizing magnetic field distribution, and engineering relative motion characteristics, one may systematically control and enhance the performance of the CBEHD.

The electrical power harvested and/or dissipated by the CBEHD is determined by the combined effects of the EMF induced in the coil and the resulting current flowing through the external circuit. The induced EMF, generated through relative vibration of the coil-supporting and magnet-supporting beams, provides the driving voltage, while the current is governed by this voltage in conjunction with the impedance of the coil and the characteristics of the connected load. Formally, the instantaneous power may be expressed as P=VI, where V represents the induced EMF and I denotes the current in the circuit. In many practical cases, where the circuit can be modeled with an equivalent resistance R, the average harvested or dissipated power can further be written as $P=V^2/R$. This relationship underscores that the energy conversion capacity of the device is jointly influenced by both the magnitude of the induced EMF and the electrical pathway through which current flows.

In one or more embodiments, the beams of the coupled-beam energy harvesting damper may be fabricated from a wide range of materials selected to achieve desired combinations of stiffness, mass, durability, and environmental resistance. Suitable options include metallic alloys such as steel, aluminum, or titanium for high strength and fatigue performance; composite materials such as carbon-fiber or glass-fiber reinforced polymers for lightweight, high-stiffness, and corrosion-resistant characteristics; and engineering-grade plastics, including nylon, polycarbonate, acetal, or polyetheretherketone (PEEK), which offer advantages of light weight, corrosion resistance, case of fabrication, and inherent damping. In certain embodiments, natural or bio-composite materials, such as laminated wood or bamboo, may also be employed to provide sustainable alternatives. The choice of material may be tailored according to the operational environment—such as marine, wind, or structural applications—and the functional role of the beam, thereby enabling optimization of energy harvesting efficiency and/or vibration mitigation.

In one or more embodiments, the housing pipe is fabricated from a substantially non-magnetic material, while the coil spool is constructed from a material that is both substantially non-magnetic and electrically non-conductive. The use of a non-magnetic housing pipe ensures that the magnetic flux generated by the permanent magnet retained within the housing pipe passes through the adjacent coil windings without distortion or attenuation caused by unintended magnetic interactions with the surrounding structure. Likewise, by fabricating the coil spool from a non-magnetic, non-conductive material, the formation of eddy currents and parasitic electromagnetic coupling is minimized, thereby preserving the integrity of the induced electromotive force and enhancing energy conversion efficiency.

Suitable materials for the coil spool may include plastics (e.g., nylon, ABS, polycarbonate, or PEEK), polymeric composites, or ceramics that provide sufficient structural stability under repeated vibrational loading while avoiding magnetic interference and electrical conductivity. Suitable materials for the housing pipe may include non-magnetic metals such as aluminum or titanium, as well as plastics, polymeric composites, or fiber-reinforced materials. It will be appreciated by those of ordinary skill in the art that other functionally equivalent materials may also be employed for the coil spool and/or housing pipe, provided such materials achieve the desired balance of electromagnetic transparency and structural integrity.

Figure 1C:
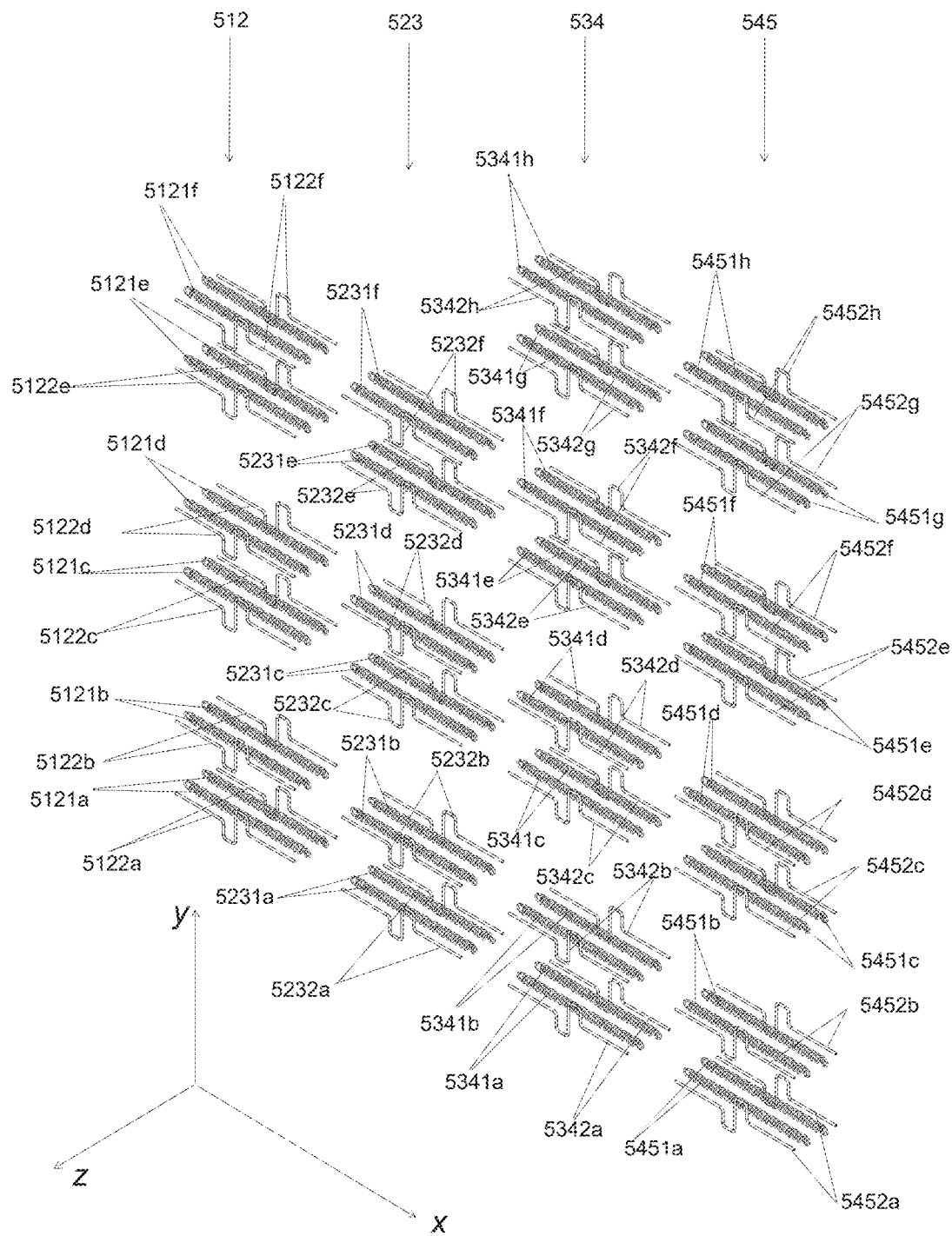
FIG. 1C is a schematic view highlighting the coupling springs and anti-collision cables of the CBEHD of FIGS. 1A-1B.

FIGS. 1A-1C illustrate an exemplary CBEHD, generally designated by reference numeral 91, constructed in accordance with the present disclosure. The depicted CBEHD 91 can be configured for energy harvesting and/or vibration damping, and is capable of operating across multiple frequency bands.

As shown in FIG. 1B, the CBEHD 91 comprises a plurality of magnet-bearing beams 11, 12, and 13, and coil-bearing beams 21 and 22. Each beam is formed of a series of modular beam units joined end-to-end by respective beam connectors, with one end of each beam fixedly secured to a common base support structure 41. This modular arrangement facilitates assembly, scalability, and selective tuning of the overall system.

Magnet-bearing beam 11 includes sequentially arranged beam units 111a-111c joined by connectors 112a-112c. The proximal beam unit 111a is rigidly affixed to the base 41, with units 111b and 111c coupled in succession via the intervening connectors. Magnet-bearing beam 12 comprises beam units 121a-121d joined by connectors 122a-122d. Unit 211a is secured to the base 41, while units 121b, 121c, and 121d are connected in sequence through the corresponding connectors. Magnet-bearing beam 13 likewise comprises beam units 131a-131d interconnected by connectors 132a-132d, with proximal unit 131a secured to the base 41.

Coil-bearing beam 21 is formed of beam units 211a-211c and connectors 212a-212c. The first unit 211a is affixed to base 41, and the subsequent units are connected in series. Coil-bearing beam 22 similarly comprises beam units 221a-221d joined by connectors 222a-222d, with proximal unit 221a anchored to the base 41. Each coil-bearing beam is outfitted with a plurality of coil assemblies. Each coil assembly includes a coil spool on which an electrical coil is wound, the coil spool being secured within the corresponding beam connector. In coil-bearing beam 21, coil spools 321a-321c are mounted in connectors 212a-212c, with coils 322a-322c wound thereon. In coil-bearing beam 22, coil spools 341a-341d are mounted in connectors 222a-222d, with coils 342a-342d wound thereon.

The magnet-beam connectors 112a-112c, 122a-122d, and 132a-132d are constructed with relatively high stiffness, such that deformation along the longitudinal axis (x-axis in FIG. 1B) of the corresponding housing pipe is substantially inhibited. This configuration advantageously preserves the alignment and structural stability of the associated magnet assemblies during operation. Consequently, the predominant portion of flexural deformation in the x-axis within the magnet-beams is contributed by the magnet-bearing beam units 111a-111c, 121a-121d, and 131a-131d. Correspondingly, upon installation of coil spools 321a-321c and 341a-341d in combination with coils 322a-322c and 342a-342d, the coil-beam connectors 212a-212c and 222a-222d acquire substantially increased stiffness. As a result, the predominant portion of flexural deformation in the x-axis within the coil-bearing beams is contributed by the coil-bearing beam units 211a-211c and 221a-221d.

Each magnet-bearing beam carries a plurality of magnet assemblies, with each magnet assembly extending between and operatively connecting two adjacent magnet-bearing beams. Specifically, magnet assembly 8131 extends between connector 112a of magnet-bearing beam 11 and connector 122a of magnet-bearing beam 12. Magnet assembly 8132 extends between connector 112b and connector 122b. Magnet assembly 8133 extends between connector 112c and connector 122c. Similarly, magnet assemblies couple magnet-bearing beam 12 to magnet-bearing beam 13, such that magnet assembly 8351 extends between connector 122a of magnet-bearing beam 12 and connector 132a of magnet-bearing beam 13; magnet assembly 8352 extends between connector 122b and connector 132b; magnet assembly 8353 extends between connector 122c and connector 132c; and magnet assembly 8354 extends between connector 122d and connector 132d.

As shown in FIG. 1B, when base support 41 of the CBEHD 91 is affixed to a vibrating host body and subjected to external excitation—such excitation including, for example, translational excitation along the longitudinal axis of the base support 41 (i.e., the x-axis of FIG. 1B) or rotational excitation within the xy-plane—relative vibratory displacement is produced between the coil-bearing beams and their adjacent magnet-bearing beams. More particularly, coil-bearing beam 21 undergoes displacement relative to magnet-bearing beams 11 and 12, while coil-bearing beam 22 undergoes displacement relative to magnet-bearing beams 12 and 13.

As a result of this relative motion, electrical coils 322a-322c, mounted on coil-bearing beam 21, move with respect to magnets supported by magnet-bearing beams 11 and 12, thereby inducing an EMF within coils 322a-322c. Likewise, coils 342a-342d, mounted on coil-bearing beam 22, move relative to magnets supported by magnet-bearing beams 12 and 13, thereby inducing a corresponding EMF within coils 342a-342d.

Depending upon the configuration of the external circuitry operatively coupled to the coils, the EMF induced therein may be selectively employed in multiple functional modes. In one implementation, the induced current may be directed outward to capture and deliver useful electrical power, which may then be stored in an energy storage device or consumed directly by external systems. In another implementation, the induced current may instead be routed through resistive or other dissipative circuitry, whereby the electrical energy is intentionally dissipated as heat or other non-recoverable forms, thus serving to attenuate the vibratory motion of the host vibrating structure. In yet another variation, the induced current may be partitioned between energy-harvesting and energy-dissipation pathways, thereby enabling concurrent delivery of useful electrical output and vibration damping within a single integrated device. By way of example, in certain embodiments, coils 322a-322c may be operatively connected to the energy-dissipation pathway, while coils 342a-342d may be coupled to an energy-harvesting pathway. Such parallel or hybrid arrangements permit simultaneous extraction of electrical energy and mitigation of structural vibrations, thereby enhancing both the efficiency and multifunctionality of the coupled-beam energy harvesting damper.

In one or more embodiments, the tuning masses are operatively secured to selected beam units and beam connectors of the CBEHD for the purpose of tailoring its vibrational characteristics. Each tuning mass may be mounted at a designated location, such as the upper or lower region of a beam unit, or alternatively at the upper end of a beam connector. By selectively positioning the tuning masses and varying their respective weights, the effective stiffness distribution of the overall beam system can be modified, thereby shifting one or more natural frequencies of the CBEHD. Through such structural adjustments, the dynamic response of the device may be tuned to achieve enhanced operational performance, including optimized energy-harvesting efficiency, improved vibration-damping capability, or a desirable balance of both functionalities under different excitation conditions.

By way of example of the embodiment in FIG. 1B:

Magnet-bearing beam 11: tuning masses 71a-71f are disposed at the following locations—71a at the top of unit 111a; 71b and 71c at the bottom and top of unit 111b, respectively; 71d and 71e at the bottom and top of unit 111c, respectively; and 71f at the top of connector 112c.

Coil-bearing beam 21: tuning masses 72a-72f are disposed as follows—72a at the top of unit 211a; 72b and 72c at the bottom and top of unit 211b, respectively; 72d and 72e at the bottom and top of unit 211c, respectively; and 72f at the top of connector 212c.

Magnet-bearing beam 12: tuning masses 73a-73h are disposed as follows—73a at the top of unit 121a; 73b and 73c at the bottom and top of unit 121b, respectively; 73d and 73e at the bottom and top of unit 121c, respectively; 73f and 73g at the bottom and top of unit 121d, respectively; and 73h at the top of connector 122d.

Coil-bearing beam 22: tuning masses 74a-74h are disposed as follows—74a at the top of unit 221a; 74b and 74c at the bottom and top of unit 221b, respectively; 74d and 74e at the bottom and top of unit 221c, respectively; 74f and 74g at the bottom and top of unit 221d, respectively; and 74h at the top of connector 222d.

Magnet-bearing beam 13: tuning masses 75a-75h are disposed as follows—a at the top of unit 131a; 75b and 75c at the bottom and top of unit 131b, respectively; 75d and 75e at the bottom and top of unit 131c, respectively; 75f and 75g at the bottom and top of unit 131d, respectively; and 75h at the top of connector 132d.

Through this arrangement, the CBEHD 91 exhibits modular adaptability, allowing precise tuning of its dynamic response to accommodate a wide range of vibration environments, including structural, mechanical, and fluid-based applications. It is further appreciated that the tuning masses may be selectively positioned at any desired location along the longitudinal axis (y-axis in FIG. 1B) of the beams, including, without limitation, the locations depicted in the foregoing illustrations.

In one or more embodiments, one or more coupling springs are provided between a coil-bearing beam and its adjacent magnet-bearing beam. These coupling springs perform two critical functions in the operation of the CBEHD.

First, the coupling springs act as energy transfer elements. As the coil-bearing beam undergoes vibration relative to the adjacent magnet-bearing beams, the coupling springs transmit mechanical energy back and forth between these structural members. In this manner, the springs enable dynamic interaction of the coil-bearing beam and the magnet-bearing beams, thereby facilitating efficient energy transfer within the CBEHD.

Second, the coupling springs temporarily store mechanical energy whenever relative displacement occurs between the coil-bearing beam and the magnet-bearing beams. This temporary storage of strain energy effectively moderates the extent of relative motion, reducing excessive displacement between the beams. Such moderation not only preserves structural integrity but also contributes to controlled energy dissipation and improved stability of the CBEHD.

The stiffness of the coupling springs exerts a critical influence on the nature and degree of interaction between the coil-bearing beam and its adjacent magnet-bearing beams. Springs designed with relatively high stiffness establish a stronger mechanical coupling, which effectively restricts the relative motion of the beams. Such constrained motion generally reduces the relative displacement between the coil and the magnet assemblies, thereby suppressing the amplitude of the induced EMF and diminishing the overall damping efficiency of the CBEHD. By contrast, coupling springs of lower stiffness—or the absence of springs altogether—permit larger relative displacements between the coil-bearing and magnet-bearing beams. These greater displacements can increase peak EMF values and enhance the damping or energy harvesting capability, particularly under excitation conditions where broad beam motion is desirable.

In the embodiment of FIG. 1B, the coupling springs are implemented as elastic springs exhibiting substantially linear force-displacement characteristics. Elastic springs are advantageous in that they provide predictable stiffness characteristics, stable restoring forces, and ease of analytical modeling, thereby facilitating precise tuning of the device's natural frequencies and reliable long-term operation. Nevertheless, the present disclosure is not limited to such implementations. In certain embodiments, one or more non-linear springs—such as variable-stiffness springs, progressive or regressive load-deflection members, or geometrically non-linear spring elements—may also be employed. Incorporation of non-linear springs may further broaden the resonance frequencies.

In one or more embodiments, a CBEHD may be equipped with one or more anti-collision cables, which serve as auxiliary safety and performance-enhancing components. The length of each anti-collision cable is specifically designed to be slightly shorter than the corresponding housing pipe, yet longer than the associated coupling springs. This relative dimensional relationship ensures that the anti-collision cables remain inactive during normal operation, but engage when excessive displacement conditions arise.

The anti-collision cables perform at least two principal functions:
a) Collision Prevention Function.
   The primary function of the anti-collision cables is to limit the maximum relative displacement between the coil-bearing beam and the magnet-bearing beam. By constraining such displacement, the cables restrict the movement between a coil spool and the magnet assembly positioned therein, thereby preventing direct physical contact or collision between (i) the coil spool and the passing housing pipe, and (ii) the coil-bearing beam connector and its adjacent magnet-bearing beam connector. This protective function becomes especially critical under conditions where the external excitation energy input exceeds the amount of energy that can be effectively converted and dissipated by the CBEHD. In such scenarios, the anti-collision cables operate as a fail-safe mechanism, absorbing excessive motion and preventing mechanical interference that could otherwise compromise the structural integrity or performance of the device.
b) Introduction of Nonlinear Vibrations.
   A secondary but significant function of the anti-collision cables is the introduction of nonlinear vibrational dynamics into the CBEHD. When the relative displacement between the coil spool and the magnet assembly reaches the effective length of the anti-collision cable, the cable suddenly engages and applies a tensile force between the coil-bearing beam and the adjacent magnet-bearing beam. This abrupt interaction generates a nonlinear vibration response, which can alter the dynamic characteristics of the CBEHD and potentially broaden the frequency response of the device.

It should be noted, however, that under standard operational conditions, the relative displacement between the coil spool and the housing pipe ensures that the anti-collision cables do not typically engage. This is advantageous, since unnecessary engagement of the cables would introduce sudden pulls and associated energy losses, thereby reducing harvesting efficiency.

The anti-collision cables are preferably fabricated from lightweight, high-strength materials to minimize inertial effects and energy dissipation during normal operation, while still providing sufficient durability and tensile strength to perform their protective and nonlinear response functions when activated.

As shown in the embodiment of FIGS. 1A-1B, adjacent beams are interconnected by coupling springs and anti-collision cables. FIG. 1C illustrates the same schematic view of the coupling springs and anti-collision cables depicted in FIG. 1A. At each connection between a beam unit and a beam connector, or at the top flange of a beam connector, two coupling springs and two anti-collision cables are provided. The coupling springs and anti-collision cables are symmetrically arranged in pairs, thereby ensuring both elastic coupling and collision prevention between adjacent beam structures.

In particular:

Between beams 11 and 21 is group 512, which includes:
a) Springs 5121*a* and cables 5122*a* extend between the flange at the connection of beam connector 112*a* and beam unit 111*a*, and the flange at the connection of beam connector 212*a* and beam unit 211*a*.
b) Springs 5121*b* and cables 5122*b* extend between the flange at the connection of beam connector 112*a* and beam unit 111*b*, and the flange at the connection of beam connector 212*a* and beam unit 211*b*.
c) Springs 5121*c* and cables 5122*c* extend between the flange at the connection of beam connector 112*b* and beam unit 111*b*, and the flange at the connection of beam connector 212*b* and beam unit 211*b*.
d) Springs 5121*d* and cables 5122*d* extend between the flange at the connection of beam connector 112*b* and beam unit 111*c*, and the flange at the connection of beam connector 212*b* and beam unit 211*c*.
e) Springs 5121*e* and cables 5122*e* extend between the flange at the connection of beam connector 112*c* and beam unit 111*c*, and the flange at the connection of beam connector 212*c* and beam unit 211*c*.
f) Springs 5121*f* and cables 5122*f* extend between the top flange of beam connector 112*c* and the top flange of beam connector 212*c*.

Between beams 21 and 12 is group 523, which includes:
a) Springs 5231*a* and cables 5232*a* extend between the flange at the connection of beam connector 212*a* and beam unit 211*a*, and the flange at the connection of beam connector 122*a* and beam unit 121*a*.
b) Springs 5231*b* and cables 5232*b* extend between the flange at the connection of beam connector 212*a* and beam unit 211*b*, and the flange at the connection of beam connector 122*a* and beam unit 121*b*.
c) Springs 5231*c* and cables 5232*c* extend between the flange at the connection of beam connector 212*b* and beam unit 211*b*, and the flange at the connection of beam connector 122*b* and beam unit 121*b*.
d) Springs 5231*d* and cables 5232*d* extend between the flange at the connection of beam connector 212*b* and beam unit 211*c*, and the flange at the connection of beam connector 122*b* and beam unit 121*c*.
e) Springs 5231*e* and cables 5232*e* extend between the flange at the connection of beam connector 212*c* and beam unit 211*c*, and the flange at the connection of beam connector 122*c* and beam unit 121*c*.
f) Springs 5231*f* and cables 5232*f* extend between the top flange of beam connector 212*c* and the flange at the connection of beam connector 122*c* and beam unit 121*c*.

Between beams 12 and 22 is group 534, which includes:
a) Springs 5341*a* and cables 5342*a* extend between the flange at the connection of beam connector 122*a* and beam unit 121*a*, and the flange at the connection of beam connector 222*a* and beam unit 221*a*.
b) Springs 5341*b* and cables 5342*b* extend between the flange at the connection of beam connector 122*a* and beam unit 121*b*, and the flange at the connection of beam connector 222*a* and beam unit 221*b*.
c) Springs 5341*c* and cables 5342*c* extend between the flange at the connection of beam connector 122*b* and beam unit 121*b*, and the flange at the connection of beam connector 222*b* and beam unit 221*b*.
d) Springs 5341*d* and cables 5342*d* extend between the flange at the connection of beam connector 122*b* and beam unit 121*c*, and the flange at the connection of beam connector 222*b* and beam unit 221*c*.
e) Springs 5341*e* and cables 5342*e* extend between the flange at the connection of beam connector 122*c* and beam unit 121*c*, and the flange at the connection of beam connector 222*c* and beam unit 221*c*.
f) Springs 5341*g* and cables 5342*g* extend between the flange at the connection of beam connector 122*d* and beam unit 121*d*, and the flange at the connection of beam connector 222*d* and beam unit 221*d*.
g) Springs 5341*h* and cables 5342*h* extend between the top flange of beam connector 122*d* and the top flange of beam connector 222*d*.

Between beams 22 and 13 is group 545, which includes:
a) Springs 5451*a* and cables 5452*a* extend between the flange at the connection of beam connector 222*a* and beam unit 221*a*, and the flange at the connection of beam connector 132*a* and beam unit 131*a*.
b) Springs 5451*b* and cables 5452*b* extend between the flange at the connection of beam connector 222*a* and beam unit 221*b*, and the flange at the connection of beam connector 132*a* and beam unit 131*b*.
c) Springs 5451*c* and cables 5452*c* extend between the flange at the connection of beam connector 222*b* and beam unit 221*b*, and the flange at the connection of beam connector 132*b* and beam unit 131*b*.
d) Springs 5451*d* and cables 5452*d* extend between the flange at the connection of beam connector 222*b* and beam unit 221*c*, and the flange at the connection of beam connector 132*b* and beam unit 131*c*.
e) Springs 5451*e* and cables 5452*e* extend between the flange at the connection of beam connector 222*c* and beam unit 221*c*, and the flange at the connection of beam connector 132*c* and beam unit 131*c*.
f) Springs 5451*g* and cables 5452*g* extend between the flange at the connection of beam connector 222*d* and beam unit 221*d*, and the flange at the connection of beam connector 132*d* and beam unit 131*d*.
g) Springs 5451*h* and cables 5452*h* extend between the top flange of beam connector 222*d* and the top flange of beam connector 132*d*.

In a CBEHD, one or more substantially rigid magnet assemblies are employed to mechanically interconnect two adjacent magnet-bearing beams such that the beams deform in a substantially similar manner during vibratory excitation. Each magnet assembly comprises at least a housing pipe and at least one permanent magnet, and may further include optional components such as a pipe cap and one or more spacers.

Figure 2A:
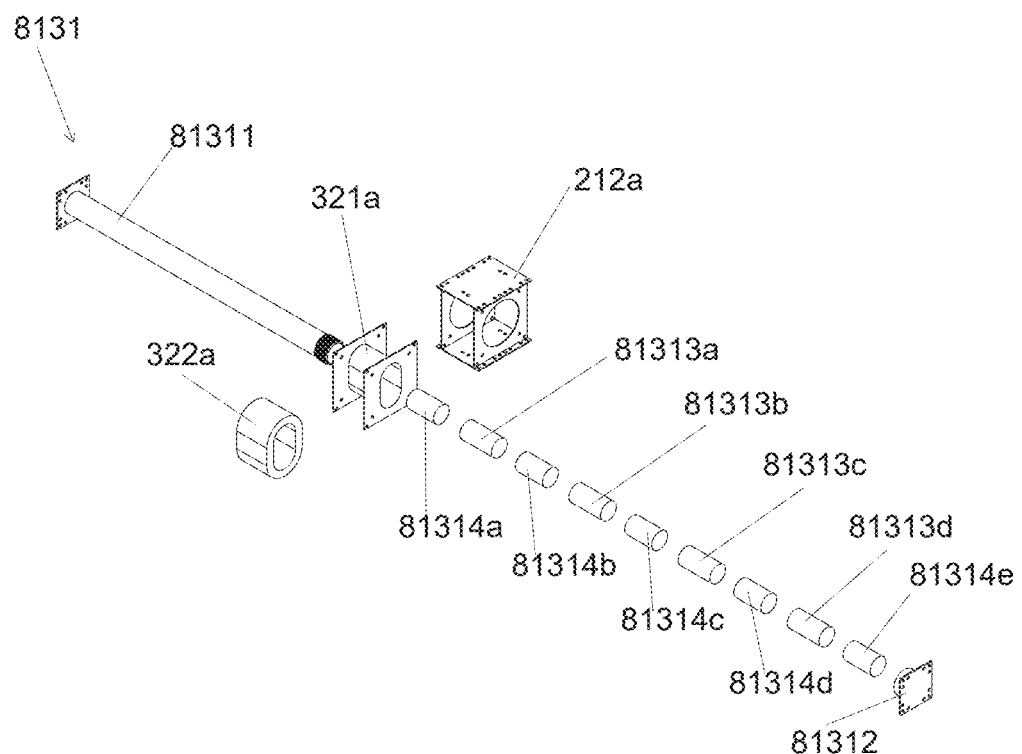
FIG. 2A is an exploded view of a representative magnet-coil assembly incorporated into the CBEHD of FIG. 1B, showing the permanent magnets, housing pipe, spacers, pipe cap, coil-bearing beam connectors, coil spool, and coil arrangement.
Figure 2B:
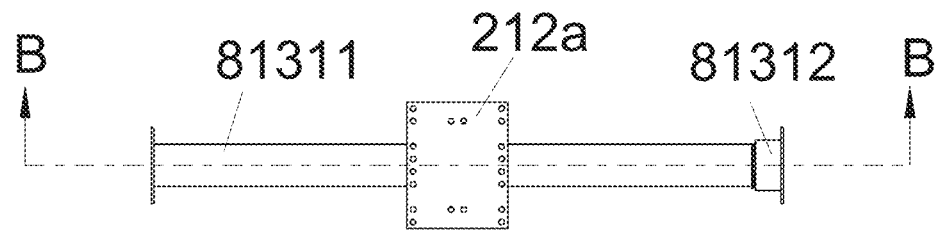
FIG. 2B is a bottom plan view of the magnet-coil assembly of FIG. 2A after installation.
Figures 2C, 2D:
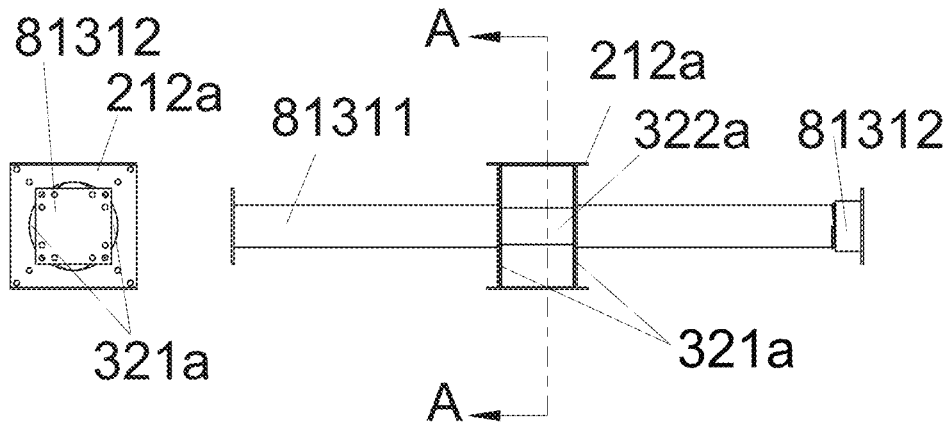
FIG. 2C is a right-side elevational view of the magnet-coil assembly of FIG. 2A after installation.
FIG. 2D is a front elevational view of the magnet-coil assembly of FIG. 2A after installation.
Figure 2E:
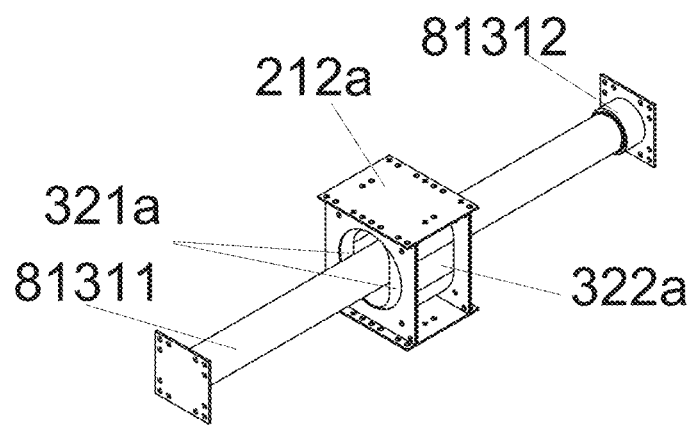
FIG. 2E is a schematic representation of the magnet-coil assembly of FIG. 2A after installation.

By way of non-limiting example, and with reference to FIG. 1B, magnet assembly 8131 (also illustrated in FIGS. 2A and 2G) comprises housing pipe 81311, pipe cap 81312, spacers 81313*a*-81313*d*, and permanent magnets 81314*a*-81314*e*. Other magnet assemblies, such as assemblies 8132, 8133, and 8351-8354, are constructed in a substantially similar manner, unless otherwise expressly specified.

By way of illustration, FIGS. 2A-2G present an exemplary embodiment of a magnet-coil assembly configured in cooperation with a coil-bearing beam connector, as generally represented in FIG. 1B. In the configuration shown in FIG. 2A, coil 322*a* is wound about coil spool 321*a*, which is inserted into connector 212*a* and mechanically secured therein. Passing through an axial bore formed in coil spool 321*a* is housing pipe 81311, which provides both alignment and structural guidance for the assembly.

Within housing pipe 81311, a sequence of permanent magnets 81314*a*-81314*e* is arranged in series with the same polarity, with intervening spacers 81313*a*-81313*d* interposed between adjacent magnets to preserve spacing.

The spacers disposed between adjacent permanent magnets are preferably fabricated from non-magnetic, electrically non-conductive materials such as polymers (e.g., nylon, acetal, PEEK), fiber-reinforced composites (e.g., glass-epoxy laminates), or ceramics, thereby minimizing eddy-current losses and magnetic flux distortion while maintaining structural spacing. It will be appreciated by those of ordinary skill in the art that other non-magnetic and mechanically suitable materials may also be employed for the spacers.

To secure the internal components, a pipe cap 81312 is mounted at an end of the housing pipe 81311, thereby enclosing and stabilizing the magnet-spacer. In certain embodiments, the spacers may be omitted where the magnets are directly affixed to the housing pipe. Likewise, the pipe cap itself may be omitted where the housing pipe is otherwise structurally coupled or integrally connected to the magnet-bearing beam, such that adequate retention and stability of the magnet assembly is maintained.

Figure 3A:
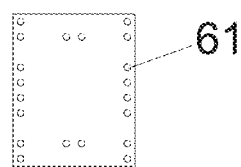
FIG. 3A is a bottom plan view of a magnet-supporting beam unit incorporated into the CBEHD of FIG. 1B.
Figure 3B:
FIG. 3B is a right-side elevational view of the magnet-supporting beam unit of FIG. 3A.
Figure 3C:
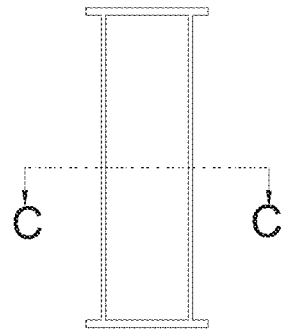
FIG. 3C is a front elevational view of the magnet-supporting beam unit of FIG. 3A.
Figure 3D:
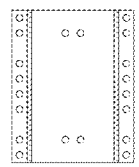
FIG. 3D is a sectional view taken along line C-C of the magnet-supporting beam unit of FIG. 3C.
Figure 3E:
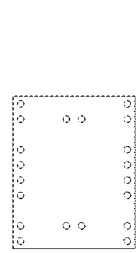
FIG. 3E is a top plan view of the magnet-supporting beam unit of FIG. 3A.
Figure 3F:
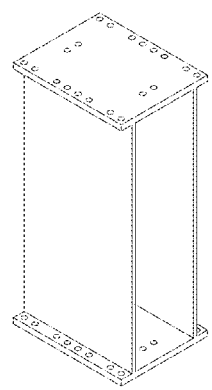
FIG. 3F is a schematic illustration of a magnet-supporting beam unit shown in FIGS. 3A-3E.
Figure 4A:
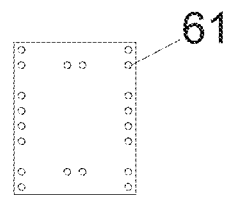
FIG. 4A is a bottom plan view of a magnet-supporting beam connector incorporated into the CBEHD of FIG. 1B.
Figure 4B:
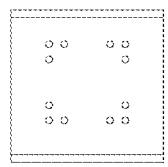
FIG. 4B is a right-side elevational view of the magnet-supporting beam connector of FIG. 4A.
Figure 4C:
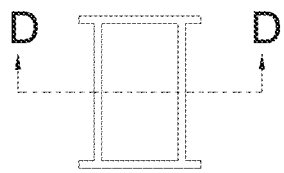
FIG. 4C is a front elevational view of the magnet-supporting beam connector of FIG. 4A.
Figure 4D:
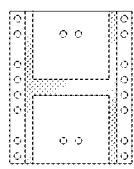
FIG. 4D is a sectional view taken along line D-D of the magnet-supporting beam connector shown in FIG. 4C.
Figure 4E:
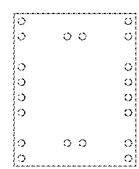
FIG. 4E is a top plan view of the magnet-supporting beam connector of FIG. 4A.
Figure 4F:
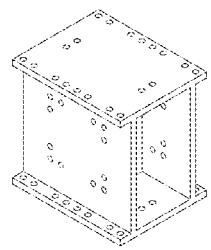
FIG. 4F is a schematic view of a magnet-supporting beam connector unit shown in FIGS. 4A-4E.
Figure 5A:
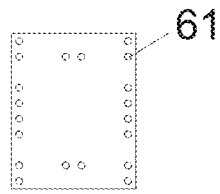
FIG. 5A is a bottom plan view of a coil-supporting beam unit incorporated into the CBEHD of FIG. 1B.
Figure 5B:
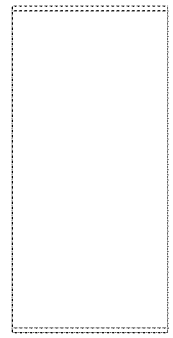
FIG. 5B is a right-side elevational view of the coil-supporting beam unit of FIG. 5A.
Figure 5C:
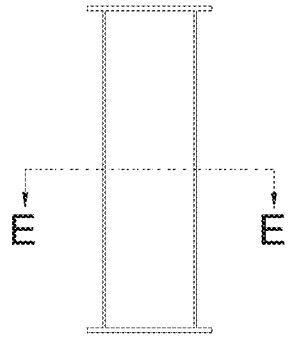
FIG. 5C is a front elevational view of the coil-supporting beam unit of FIG. 5A.
Figure 5D:
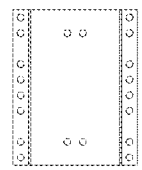
FIG. 5D is a sectional view taken along line E-E of the coil-supporting beam unit shown in FIG. 5C.
Figure 5E:
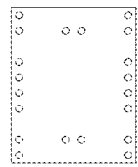
FIG. 5E is a top plan view of the coil-supporting beam unit of FIG. 5A.
Figure 5F:
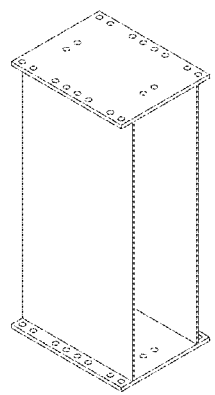
FIG. 5F is a schematic illustration of a coil-supporting beam unit shown in FIGS. 5A-5E.
Figure 6A:
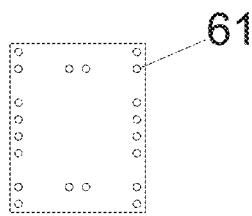
FIG. 6A is a bottom plan view of a coil-supporting beam connector incorporated into the CBEHD of FIG. 1B.
Figure 6B:
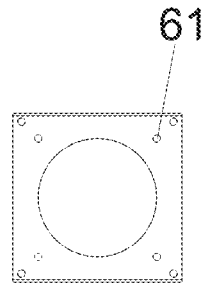
FIG. 6B is a right-side elevational view of the coil-supporting beam connector of FIG. 6A.
Figure 6C:
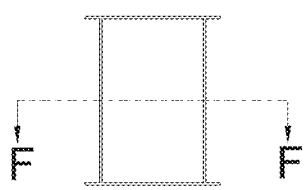
FIG. 6C is a front elevational view of the coil-supporting beam connector of FIG. 6A.
Figure 6D:
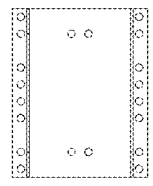
FIG. 6D is a sectional view taken along line F-F of the coil-supporting beam connector shown in FIG. 6C.
Figure 6E:
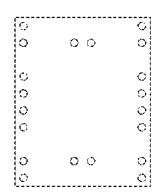
FIG. 6E is a top plan view of the coil-supporting beam connector of FIG. 6A.
Figure 6F:
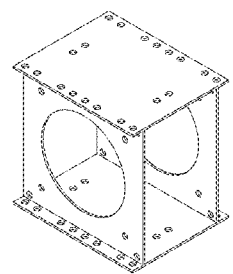
FIG. 6F is a schematic view of a coil-supporting beam connector shown in FIGS. 6A-6E.
Figure 7A:
FIG. 7A is a bottom plan view of a coil spool incorporated into the CBEHD of FIG. 1B.
Figure 7B:
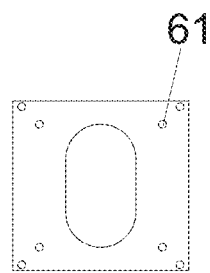
FIG. 7B is a right-side elevational view of the coil spool of FIG. 7A.
Figure 7C:
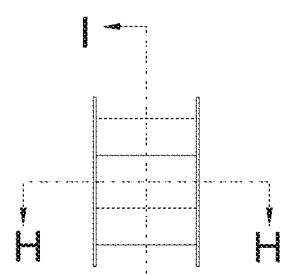
FIG. 7C is a front elevational view of the coil spool of FIG. 7A.
Figure 7D:
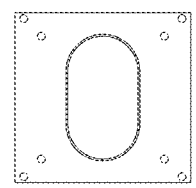
FIG. 7D is a sectional view taken along line I-I of the coil spool shown in FIG. 7C.
Figure 7E:
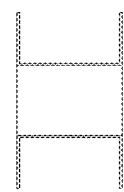
FIG. 7E is a sectional view taken along line H-H of the coil spool shown in FIG. 7C.
Figure 7F:
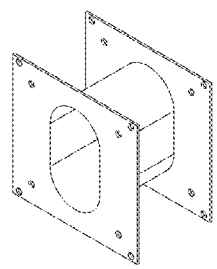
FIG. 7F is a schematic illustration of a coil spool shown in FIGS. 7A-7E.
Figure 8A:
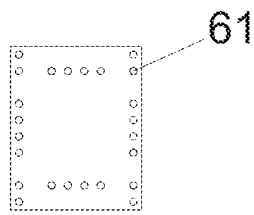
FIG. 8A is a bottom plan view of an alternative beam unit that may be configured as either a magnet-supporting or a coil-supporting beam unit.
Figure 8B:
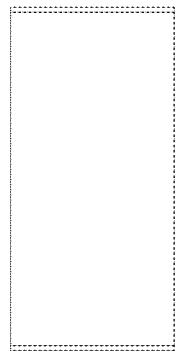
FIG. 8B is a right-side elevational view of the alternative beam unit of FIG. 8A.
Figure 8C:
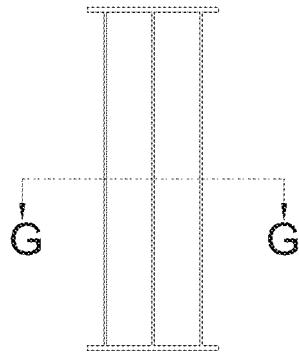
FIG. 8C is a front elevational view of the alternative beam unit of FIG. 8A.
Figure 8D:
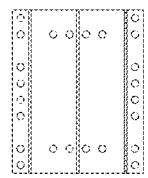
FIG. 8D is a sectional view of the alternative beam unit of FIG. 8A.
Figure 8E:
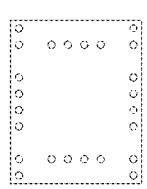
FIG. 8E is a top plan view of the alternative beam unit of FIG. 8A.
Figure 8F:
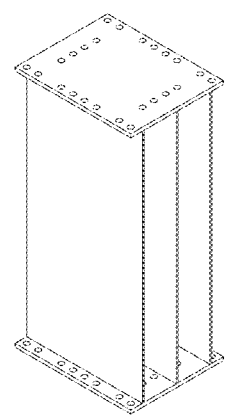
FIG. 8F is a schematic view of the alternative beam unit of FIGS. 8A-8E.

As illustrated in FIGS. 1A-1B, 3A-3F, and 5A-5F, each beam unit is formed with a generally II-shaped (or "double-I") profile in the xy-plane. In addition, the overall depth of the beam unit, measured along the z-axis (FIG. 1A and FIG. 3B), is greater than its width measured along the x-axis (FIG. 1A and FIG. 3C). Moreover, the flange portion of the beam unit is formed with a thickness greater than that of the web portion, such that the flange remains approximately parallel to the housing pipe during relative displacement. Collectively, these structural features impart anisotropic stiffness characteristics—providing enhanced resistance to transverse deformation while permitting controlled flexibility along the longitudinal axis (x-axis in FIG. 1A) of the housing pipe—and allow for large relative displacements without contact or interference between the housing pipe and coil spool, thereby accommodating operational vibrations.

It should be appreciated that the II-shaped profile described herein is merely illustrative and not limiting. Alternative multi-I profiles—formed by arranging two or more I-shaped profiles in parallel—may likewise be employed to tailor stiffness characteristics, mass distribution, and vibrational modal behavior. By way of non-limiting example, beam units may instead be configured with III-, IIII-, or higher-order multi-I profiles. As specifically illustrated in FIGS. 8A-8F, a triple-I profile may be substituted for the double-I configuration to achieve comparable or enhanced performance characteristics.

Figure 2F:
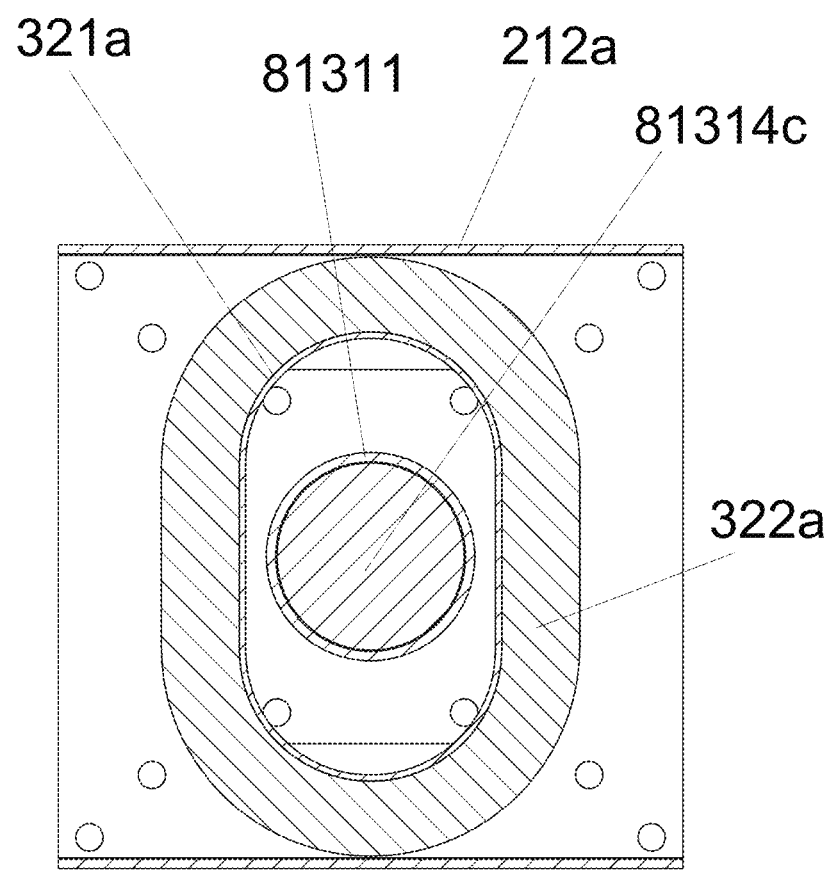
FIG. 2F is a sectional view taken along line A-A of the magnet-coil assembly shown in FIG. 2D, illustrating the relative positioning of the magnet within the coil bore.
Figure 2G:
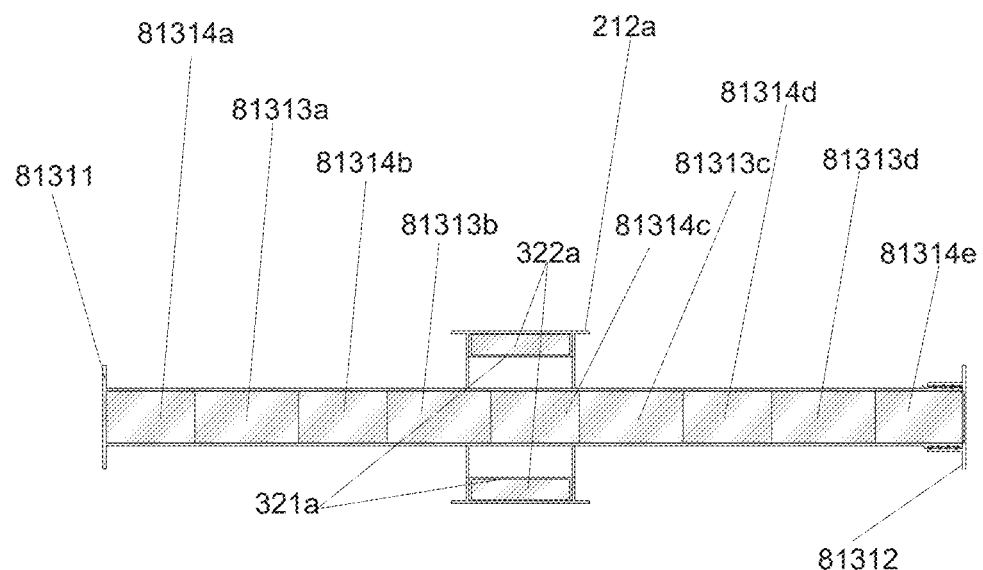
FIG. 2G is a sectional view taken along line B-B of the magnet-coil assembly shown in FIG. 2B.

In one or more embodiments, and with reference to the exemplary configuration shown in FIG. 2F, a deliberate clearance is established between the exterior surface of housing pipe 81311 and the interior boundary of coil spool 321a. The clearance is dimensioned to be relatively smaller along the lateral direction (z-axis in FIG. 1A) of the beam 21, while being comparatively larger along the longitudinal direction (y-axis in FIG. 1A) of the beam 21. This tailored dimensional relationship permits coil spool 321a to undergo relative displacement primarily along the longitudinal axis of housing pipe 81311, while avoiding mechanical interference with it. The reduced clearance in the transverse direction advantageously promotes efficient electromagnetic coupling between coil 322a and the permanent magnets 81314a-81314e, yet still maintains sufficient separation to prevent physical contact and associated wear during dynamic operation. Other magnet-coil assemblies illustrated in FIG. 1B are fabricated and configured in substantially the same manner.

It will be appreciated by those of ordinary skill in the art that the clearance dimension established along the y-axis is preferably selected to be compatible with the spatial envelope defined by anti-collision cables 5122a-5122f and 5232a-5232f in FIG. 1C. More specifically, the clearance is configured such that, under all anticipated operating conditions—including vibration-induced beam deflections, elastic elongation of the anti-collision cables, and standard manufacturing tolerances—the housing pipes 8131-8133 remain in a non-contact relationship with the adjacent coil spools 321a-321c. By ensuring such separation, the design mitigates unintended collision or physical contact, reduces wear and mechanical interference, and thereby preserves both the structural integrity of the device and the reliability of its energy-harvesting performance.

Although FIG. 2F depicts coil spool 321a as having an obround bore for receiving the housing pipe, it will be understood by those ordinarily skilled in the art that alternative geometries may likewise be employed. The aperture may, for example, assume an oval, rectangular, circular, square, or other polygonal configuration, depending on design considerations, manufacturing efficiencies, or desired electromagnetic performance. In a similar manner, while the embodiment of FIG. 2F depicts cylindrical permanent magnets positioned within a round housing pipe, the disclosure is not limited to such geometry. Alternative magnet shapes—including prismatic, cubic, hexagonal, or custom-profiled forms—may be utilized, provided the geometry of the housing pipe and the corresponding bore of the coil spool are suitably adapted. These design alternatives allow optimization of the magnetic flux distribution, overall device compactness, and case of fabrication, thereby broadening the versatility of the disclosed CBEHD.

Furthermore, it should be appreciated that the relative positioning of the coils and magnets may be reversed without departing from the scope of the present disclosure. For instance, the magnets arranged within the housing pipe and supported by the magnet-bearing beams may instead be replaced with one or more coils, while the coil supported by the coil-bearing beam is substituted with, for instance, a ring-shaped or annular permanent magnet. In such a configuration, the functional roles of the coil-bearing beam and the magnet-bearing beams are interchanged, such that the former assumes the role of a magnet-bearing beam and the latter serve as coil-bearing beams. Likewise, the functional roles of the coil spool and magnet assembly are also interchanged, and the respective materials of these components may also be selected in accordance with their interchanged functions. This reversal provides additional design flexibility, enabling those of ordinary skill in the art to select between coil-in-beam and magnet-in-beam configurations to suit particular application environments, performance objectives, or manufacturing constraints.

To further facilitate an understanding of the present disclosure, representative structural features of components of the CBEHD 91 are described below with reference to the accompanying figures. As illustrated in FIGS. 3A-3F, the construction and geometry of a representative magnet-bearing beam unit 111a are shown. These figures depict the cross-sectional profile, dimensional proportions, and interface regions configured to accommodate secure connection with adjacent beam connectors.

Turning to FIGS. 4A-4F, the structural arrangement of a magnet-bearing beam connector 112a is presented, corresponding to the connector generally depicted in FIG. 1B. The connector is shown in multiple perspectives to highlight mounting flanges, attachment features, and optional recesses configured to receive tuning masses, spacers, or other auxiliary components.

As illustrated in FIGS. 5A-5F, the construction and geometry of a representative coil-bearing beam unit 211*a* are shown. These figures depict the cross-sectional profile, dimensional proportions, and interface regions configured to accommodate secure connection with adjacent beam connectors.

In FIGS. 6A-6F, the structure of a coil-bearing beam connector 212*a* is illustrated, also corresponding to the connector arrangement identified in FIG. 1B. These views demonstrate the interface geometry by which coil spools are retained, as well as structural reinforcement features provided for load transfer between adjoining beam units.

FIGS. 7A-7F depict an exemplary coil spool 321*a*, as previously referenced in FIG. 1A. The figures illustrate the coil spool's winding surface, hub features, and securing flanges that permit stable mounting within the corresponding beam connector, while accommodating a wound electrical coil.

It should be understood that the particular configurations of the beam units, beam connectors, and coil spool shown in FIGS. 3A-7F represent exemplary embodiments of the invention. Modifications, substitutions, or variations may be made to these components without departing from the scope of the present disclosure, including, but not limited to, alterations in geometry, dimensions, profiles, or material composition.

It is well established in the art that resonance provides an efficient mechanism for transferring mechanical energy. In the present CBEHD 91, each magnet-bearing beam 11-13 and coil-bearing beam 21-22 may be regarded as a continuous system having, in theory, an infinite number of natural frequencies. Through judicious selection of design parameters—including beam length, geometry, stiffness, and material, as well as coupling spring stiffness and the weight of coils, magnets, and tuning masses—the CBEHD can be configured to achieve a variety of vibration modes for both coil-bearing and magnet-bearing beams. When the frequency of an external excitation approaches or coincides with a natural frequency of the CBEHD, resonance occurs, amplifying the relative displacement between a coil-bearing beam and the adjacent magnet-bearing beams (for example, between beams 11, 21, and 12). This amplified motion produces a corresponding displacement between coil 322*a* and magnet assembly 81311, thereby inducing an EMF in coil 322*a*; likewise, EMF is induced in coils 322*b*-322*c* and 342*a*-342*d*.

In FIG. 1A, a plurality of holes 61 is shown on various structural elements, including the base support structure, the beam units, the beam connectors, the coil spools, the housing pipe, and the pipe cap. These holes facilitate assembly by enabling straightforward mechanical connection of the respective components, thereby promoting accurate alignment and structural stability of the coupled-beam energy harvesting damper during installation and operation. In addition, the base support structure may include dedicated holes 62 configured to secure the base support to a host vibrating body, such as a structural frame, machinery housing, or other host substrate from which vibratory energy is to be harvested.

It will be appreciated by those of ordinary skill in the art that the provision of holes 61 (see FIGS. 1A and 3A-8F) and hole 62 (see FIG. 1A) is optional and non-limiting. In one or more embodiments, some or all of the holes may remain unused, depending on specific design requirements, installation conditions, or desired performance characteristics. Moreover, alternative fastening or joining techniques may be employed either in place of, or in combination with, the hole configuration. Such alternatives include, without limitation, welding, bolting, riveting, adhesive bonding, or other conventional mechanical fastening approaches known in the art. The selection of fastening method may be based on factors such as ease of assembly, structural rigidity, environmental durability, or maintenance considerations. Through this design flexibility, the coupled-beam energy harvesting damper can be adapted for a wide variety of practical applications, accommodating variations in manufacturing preferences, installation environments, and operational constraints, while preserving the functionality and reliability of the CBEHD.

Although, in the illustrated embodiment of FIG. 1A, the beams are shown as being affixed to the base support structure 41 of the CBEHD 91, alternative embodiments may adopt different boundary conditions. By way of example, such boundary conditions may include simply-supported, sliding, or elastically compliant supports, each of which can alter the vibrational characteristics, natural frequencies, or mode shapes of the device.

The present disclosure contemplates a variety of structural and parametric adjustments that may be employed independently or in combination to alter the natural frequencies of the CBEHD 91. By way of example and not limitation, suitable tuning parameters include beam length, beam stiffness, beam material, coupling-spring stiffness, magnet weight, magnet placement, coil weight, coil placement, tuning-mass weight, and tuning-mass placement. Representative tuning approaches include the following:

Beam length Adjustment. Increasing the length of one or more beams reduces the natural frequency of the CBEHD 91. Conversely, decreasing the length results in an upward shift of the frequency response.

Tuning Mass Variation. Augmenting the magnitude of tuning masses positioned on the beam units or connectors lowers the natural frequency of the device, while reducing the tuning mass produces the opposite effect. Placement of the tuning masses at different beam locations further enables fine adjustment of frequency distribution.

Coupling Spring Stiffness. Increasing the stiffness of the coupling springs elevates the natural frequency of the CBEHD. A reduction in spring stiffness produces a corresponding decrease in frequency. It should be appreciated by those of ordinary skill in the art that a single coupling spring may be operatively connected to the beams through turnbuckles, and that a functionally equivalent coupling spring may alternatively be formed by joining two springs together by means of one or more turnbuckles, which may further serve to adjust the effective stiffness or length of the springs.

Coil or Coil Spool Mass. Increasing the mass of the coil windings, coil spool, or both decreases the natural frequency. Lighter coil assemblies reduce inertial loading and raise the natural frequency.

Magnet Assembly Mass. Increasing the mass of the magnet assembly—including the magnets, interposed spacers, or associated housing pipes—lowers the natural frequency, while reducing mass yields an increase in natural frequency.

Beam Stiffness Properties. Increasing the bending stiffness of the beam units—achieved, for example, by raising the bending moment of inertia of the beam cross-section or selecting materials with a higher elastic modulus—results in a higher natural frequency. Conversely, reducing the stiffness properties lowers the frequency.

In operation, the CBEHD may be tuned by selectively and iteratively adjusting the structural parameters of its beams and coupling springs. For example, one of ordinary skill in the art may vary the effective weight of a tuning mass by adding or removing modular weight elements, thereby shifting the fundamental natural frequency of the associated beams. In another example, one of ordinary skill in the art may preload a coupling spring through use of a turnbuckle, or equivalent mechanism, thereby modifying the effective stiffness between adjacent beams. These tuning steps may be repeated until the monitored electrical output of the device—such as voltage, current, or power—achieves a desired performance level.

Through the above methods, the CBEHD 91 can be tailored to match a wide range of excitation environments. Such adaptability makes the CBEHD 91 suitable for both broadband and narrowband applications, depending on the requirements of a given deployment.

It is noted that, for clarity of presentation, certain components depicted in FIGS. 1A-1C are not relabeled in the subsequent figures, although their function and relationship to the newly introduced elements remain consistent with the earlier description. This approach avoids unnecessary repetition while preserving the overall understanding of the device.

In one or more embodiments, the geometric dimensions of the beam units and connectors may be either uniform throughout the device or, alternatively, intentionally varied to accommodate particular design requirements. For example, the height of a coil-bearing beam may be selectively configured to differ from the height of a magnet-bearing beam. Such variation permits enhanced flexibility in structural tuning, enabling optimization of resonance characteristics and energy conversion efficiency. Notwithstanding such dimensional variations, it is appreciated that the spatial alignment between the coil-bearing beam connectors and the magnet-bearing beam connectors must be maintained with sufficient precision. Proper alignment ensures that the relative positioning of the coils and magnets remains within an effective coupling range, thereby preserving electromagnetic interaction, safeguarding the integrity of energy transfer, and maintaining the reliability of energy harvesting performance.

Figure 9:
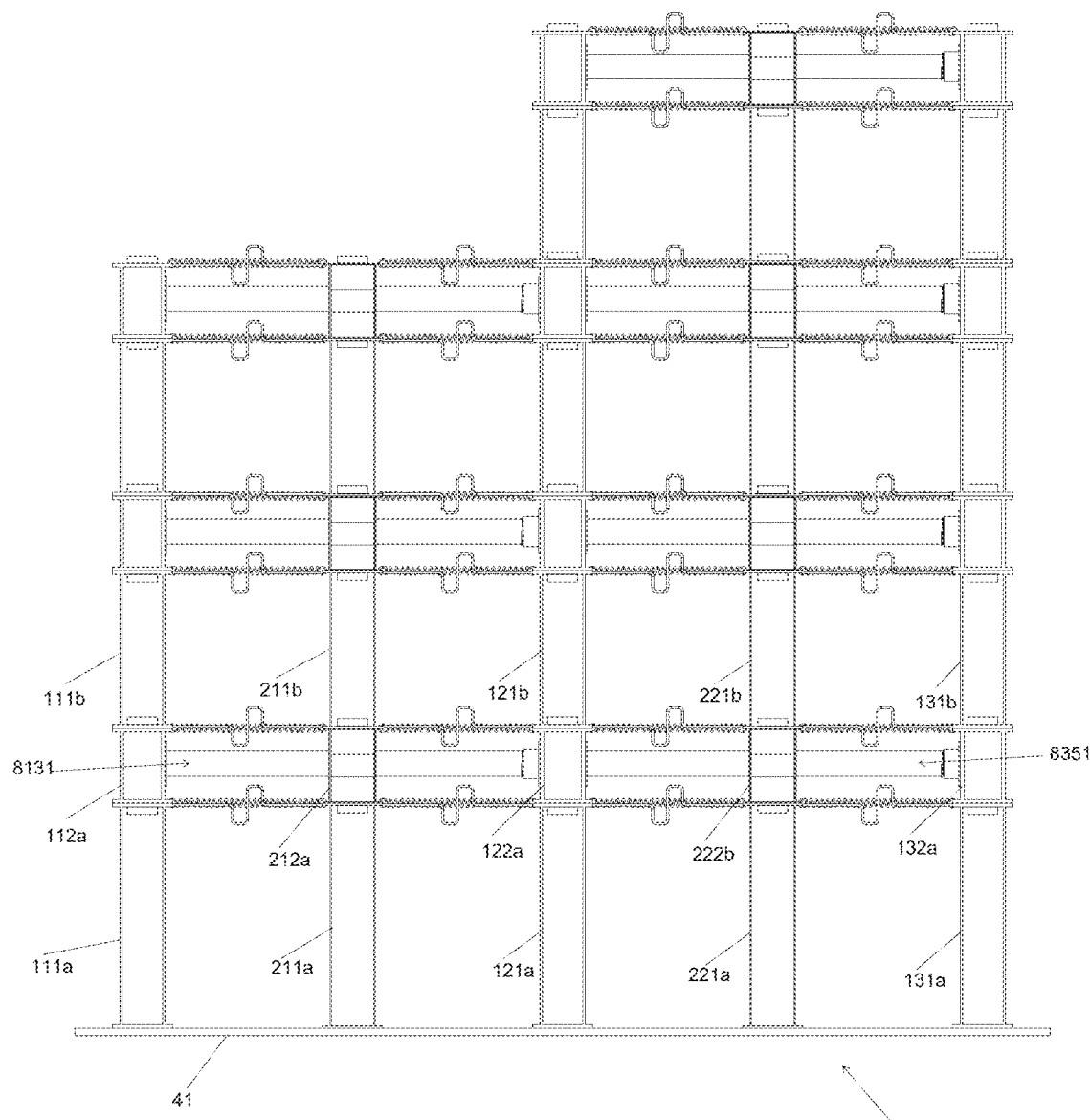
FIG. 9 is a schematic view of a CBEHD incorporating beam units of differing lengths.

By way of illustration, FIG. 9 schematically illustrates an exemplary embodiment of the coupled-beam energy harvesting damper, generally designated as CBEHD 92. In this embodiment, coil-bearing beam unit 111a is configured with a different height than coil-bearing beam unit 111b. Notwithstanding this dimensional modification, coil-bearing connector 212a remains in alignment with magnet-bearing beam connectors 112a and 122a, thereby ensuring effective electromagnetic coupling between the coil and magnet assemblies.

Likewise, beam unit 211a is taller than beam unit 211b; beam unit 121a is taller than beam unit 121b; beam unit 221a is taller than beam unit 221b; and beam unit 131a is taller than beam unit 131b. In each such instance, the corresponding connectors (e.g., beam connector 222b) remain properly aligned with adjacent magnet-bearing beam connectors (such as 122a and 132a) so as not to disrupt the relative positioning of the coils and magnets, thereby preserving energy transfer integrity.

Dimensional variations of the beam units and/or connectors—including, for example, changes in height or other structural parameters—may be implemented without diminishing electromagnetic performance, provided that the connectors are designed to maintain critical coil-magnet alignment across the coupled-beam energy harvesting damper (CBEHD). Such modular arrangements may include two or more beam units joined directly together, two or more connectors joined directly together, an alternating sequence of beam units and connectors, or any combination thereof. While these configurations can be tailored to meet specific installation requirements, it remains essential that the connectors associated with the magnet-bearing beams and the coil-bearing beams maintain proper spatial alignment. Preservation of this alignment ensures that electromagnetic coupling between the coils and magnets is retained, regardless of the modular configuration selected.

Further, in one or more embodiments, the coil-bearing beams and magnet-bearing beams need not adhere strictly to the modular construction illustrated in FIG. 1B. Instead, these components may be fabricated as one or more integral pieces, depending on the manufacturing process or structural requirements. Such flexibility in fabrication allows for improved manufacturability and installation, reduced assembly complexity, and enhanced robustness of the CBEHD, without departing from the intended functional relationship between the coil-bearing beams, magnet-bearing beams, and associated electromagnetic components.

In one or more embodiments, it is appreciated that not every coil-bearing beam connector must necessarily be equipped with a coil spool or a corresponding coil. Likewise, not every magnet-bearing beam connector is required to support or retain a magnet assembly. Stated differently, certain coil-bearing connectors may be intentionally left vacant, without a coil spool or coil disposed therein, while still performing their structural function within the coupled-beam framework. Such a placement of the magnets and/or coils may further be employed to adjust or tune the operating frequency.

Similarly, one or more magnet-bearing connectors may be provided without a magnet assembly bridging them, thereby serving primarily as structural or alignment members rather than as active participants in electromagnetic induction. This design flexibility allows the CBEHD to be selectively configured depending on desired energy harvesting capacity, weight optimization, manufacturing cost, or other application-specific objectives.

It will be appreciated by those of ordinary skill in the art that, in embodiments where a coil-bearing beam connector is not equipped with an electrical coil, the structural integrity of the beam may be compromised due to the absence of the reinforcing coil spool and associated winding. The bending stiffness of such a coil-bearing beam connector is preferably increased to ensure that the beam maintains sufficient rigidity and mechanical stability under vibratory loading. This may be accomplished, for example, by enlarging the cross-sectional dimensions of the connector, employing materials of higher modulus, or incorporating localized reinforcement features. In this manner, the connector continues to provide the desired mechanical support and alignment for the coupled-beam assembly even when no coil is installed.

By permitting selective omission of coils or magnet assemblies, the overall CBEHD architecture can be tailored to achieve a range of performance characteristics. For example, in applications where reduced damping or lower power generation suffices, fewer coils and magnets may be deployed while maintaining adequate structural stability. Conversely, when higher energy conversion efficiency is required, a greater proportion of connectors may be populated with active coils and magnet assemblies.

In one or more embodiments, a coupled-beam energy harvesting damper may incorporate one or more coil-bearing beams together with two or more magnet-bearing beams. For example, the configuration illustrated in FIG. 1B includes two coil-bearing beams and three magnet-bearing beams. It should be appreciated, however, that the number of coil-bearing beams and magnet-bearing beams in a CBEHD may be increased or decreased according to design considerations, performance requirements, or installation constraints.

At a minimum, a coupled-beam energy harvesting damper comprises at least one coil-bearing beam and at least two magnet-bearing beams in order to achieve effective electromagnetic coupling and energy conversion.

Increasing the number of beams within the coupled-beam energy harvesting damper can provide additional useful natural frequencies, thereby broadening the operational bandwidth of the device. With each additional beam, new vibration modes may be introduced into the CBEHD. This can be advantageous for capturing energy across a wider range of excitation frequencies. However, the inclusion of too many beams may also introduce complexity in tuning, particularly when coupling springs are utilized to interconnect the beams. In such cases, CBEHD optimization may become more challenging. Conversely, when coupling springs are not employed, one skilled in the art may independently tune the coil-bearing beams and adjust the magnet-bearing beams in pairs, thereby simplifying the tuning process.

In one or more embodiments, the CBEHD may be readily scaled by varying the number of magnet assemblies positioned along a given magnet-bearing beam and/or the number of coils and coil spools mounted on a corresponding coil-bearing beam. Such scaling can be achieved by incorporating additional beam units and/or beam connectors, thereby extending the overall length or height of the respective beams as required to meet performance objectives.

Figure 10:
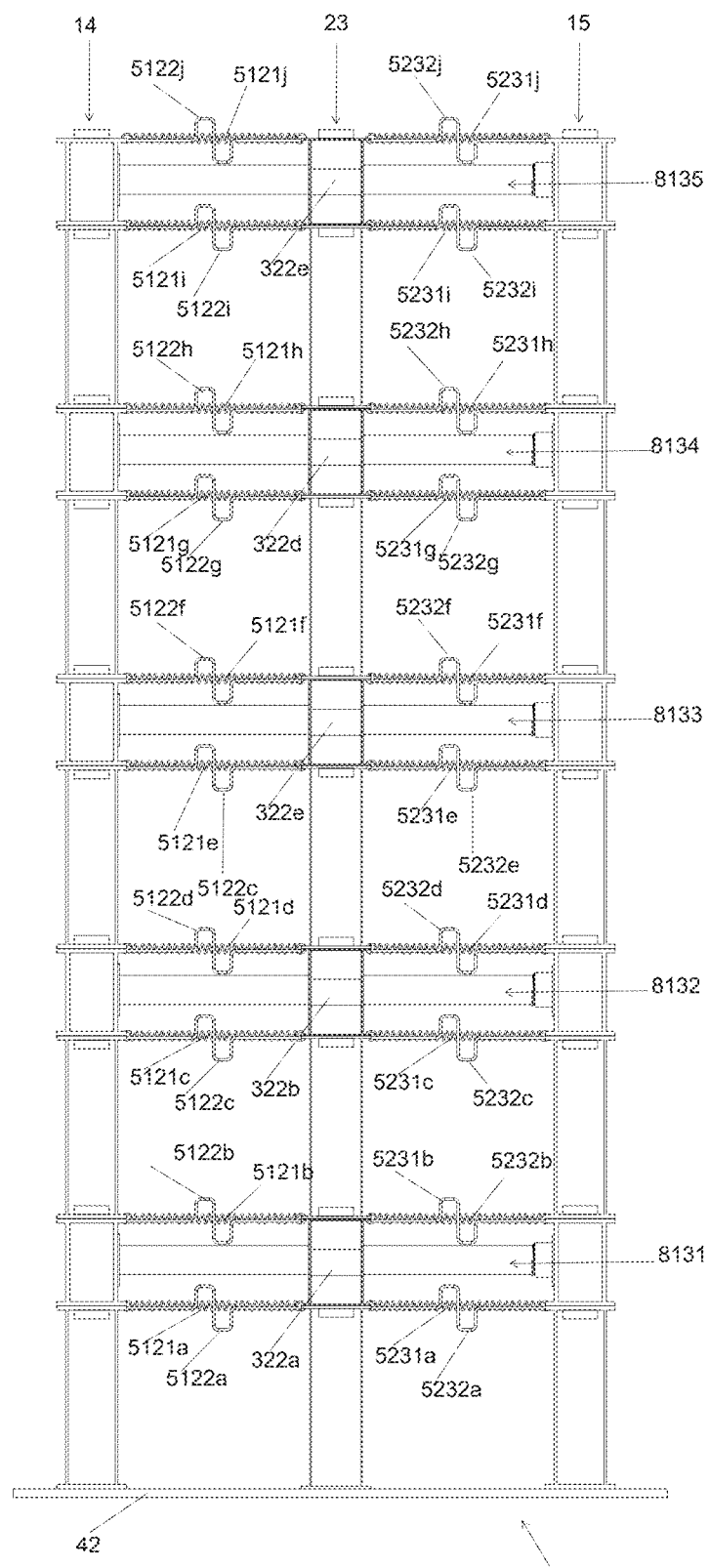
FIG. 10 is a schematic view of a CBEHD incorporating five sequentially connected beam units.

By way of illustration, FIG. 10 schematically illustrates an exemplary embodiment of the CBEHD, generally designated as CBEHD 93, which employs a simplified configuration including a single coil-bearing beam 23 and two magnet-bearing beams 14 and 15. CBEHD 93 incorporates the base support structure 42 and five coils 322*a*-322*e*, each aligned with a corresponding magnet assembly 8131-8135. In this arrangement, coil-bearing beam 23 and magnet-bearing beam 14 are mechanically coupled by a series of coupling springs 5121*a*-5121*j* and anti-collision cables 5122*a*-5122*j*. Likewise, coil-bearing beam 23 and magnet-bearing beam 15 are interconnected by coupling springs 5231*a*-5231*j* in combination with anti-collision cables 5232*a*-5232*j*.

It should be recognized that the addition of coils and magnet assemblies not only enhances the energy conversion capacity but also increases the mass and height of the beam structures. Such modifications may introduce additional low-frequency vibration modes due to the increased inertial and structural effects of the added components.

In one or more embodiments, the relative height of the beams within a coupled-beam energy harvesting damper may be configured either uniformly or with intentional variation. Employing uniform beam lengths can streamline design and reduce complexity, while adopting non-uniform lengths allows broader adaptability and frequency-tuning options. For example, as depicted in FIG. 1B, coil-bearing beam 22 of CBEHD 91 is constructed with a greater height relative to coil-bearing beam 21. Similarly, magnet-bearing beams 12 and 13 extend higher than magnet-bearing beam 11. By contrast, the configuration illustrated in FIG. 10, corresponding to CBEHD 93, employs a uniform design in which all beams are of equal length.

Variation in beam length provides a practical and effective mechanism for tuning the dynamic response of the CBEHD. Specifically, adjusting the length of one or more coil-bearing beams and/or magnet-bearing beams alters natural frequencies and vibration modes of the structure. This enables the designer to shift the resonant characteristics of the CBEHD to align with the frequency range of the external excitation source.

In one or more embodiments, the dynamic response of a coupled-beam energy harvesting damper may be tailored by varying the relative bending stiffness, mass distribution, and spring stiffness between the coil-bearing beams and the magnet-bearing beams. For instance, when the attached masses and the stiffness of the coupling springs are held constant, an increase in the difference in bending stiffness between the coil-bearing beam units and the magnet-bearing beam units produces a greater relative displacement between the coil and the magnet assembly under identical excitation conditions. Conversely, when the bending stiffness and coupling springs remain constant, a larger difference in the masses of the coil-bearing beam and its adjacent magnet-bearing beams likewise increases the relative displacement between the coil and magnet assembly. Further, when the masses and bending stiffness are unchanged, reducing the stiffness of the coupling springs results in greater relative displacement between the coil and the magnet assembly under the same vibrational excitation.

In one or more embodiments, one or more of the coil-bearing beams or magnet-bearing beams may be configured as rigid members, such that their deformation is negligible relative to that of adjacent flexible beams. The incorporation of such rigid beams within the CBEHD yields multiple functional advantages. For example, under conditions of excessively strong excitation, the rigid beams can limit overall displacement of the CBEHD along the axial direction of the housing pipe when coupled by springs, thereby protecting both structural elements and electromagnetic components. In addition, the presence of a rigid beam can amplify relative displacement with respect to an adjacent flexible beam. Because the rigid beam, by virtue of its negligible deformation, absorbs little energy from the neighboring flexible beam, the adjacent flexible beam undergoes greater vibratory motion relative to the rigid beam than if the beam were not rigid, thereby enhancing relative displacement.

It should be understood that, within the CBEHD, at least two directly adjacent beams are configured such that they are not both formed as rigid members, thereby ensuring that relative motion is preserved and useful vibrational modes are maintained. Moreover, in the case of magnet-bearing beams coupled through magnet assemblies, when one of the beams is formed as a rigid member, the associated connectors supporting the magnet assemblies likewise exhibit negligible displacement during operation. Accordingly, the portions of magnet-bearing beams underlying such connectors may also be regarded as rigid for purposes of the present disclosure.

While rigid beams provide important advantages in stability and displacement control, their inclusion also introduces trade-offs. Specifically, the number of useful natural frequencies available to the CBEHD may be reduced, since rigid beams contribute minimally to vibrational modes due to their negligible deformation under excitation. Consequently, only the non-rigid beams contribute meaningfully to the useful natural frequencies of the coupled-beam energy harvesting damper.

Figure 11:
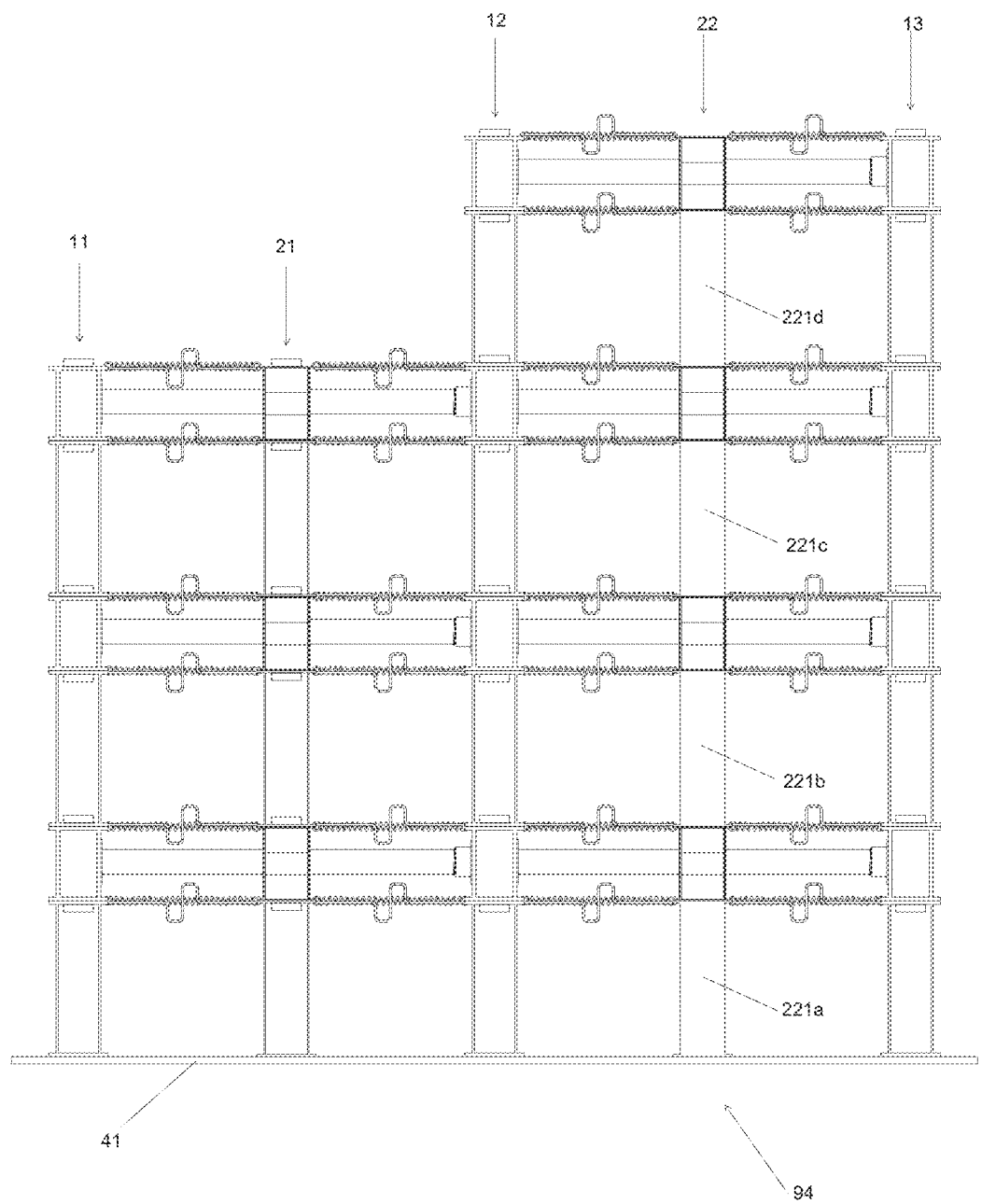
FIG. 11 is a schematic view of a CBEHD including a rigid coil-bearing beam.

By way of illustration, FIG. 11 illustrates an exemplary embodiment of the coupled-beam energy harvesting damper, generally designated as CBEHD 94, which incorporates rigid beam units 221*a*-221*d*. Because these units are designed to resist bending, the coil-bearing beam 22 undergoes negligible deformation when the device is subjected to external excitation, in contrast to the flexible magnet-bearing beams 11-13 and coil-bearing beam 21. A person of ordinary skill in the art will appreciate that such rigid units may be readily achieved by increasing the thickness of the beam sections to form a solid or hollow profile with substantially enhanced bending stiffness, and that the design is not limited to the use of an II-shaped beam unit shown in FIG. 1B.

Figure 12:
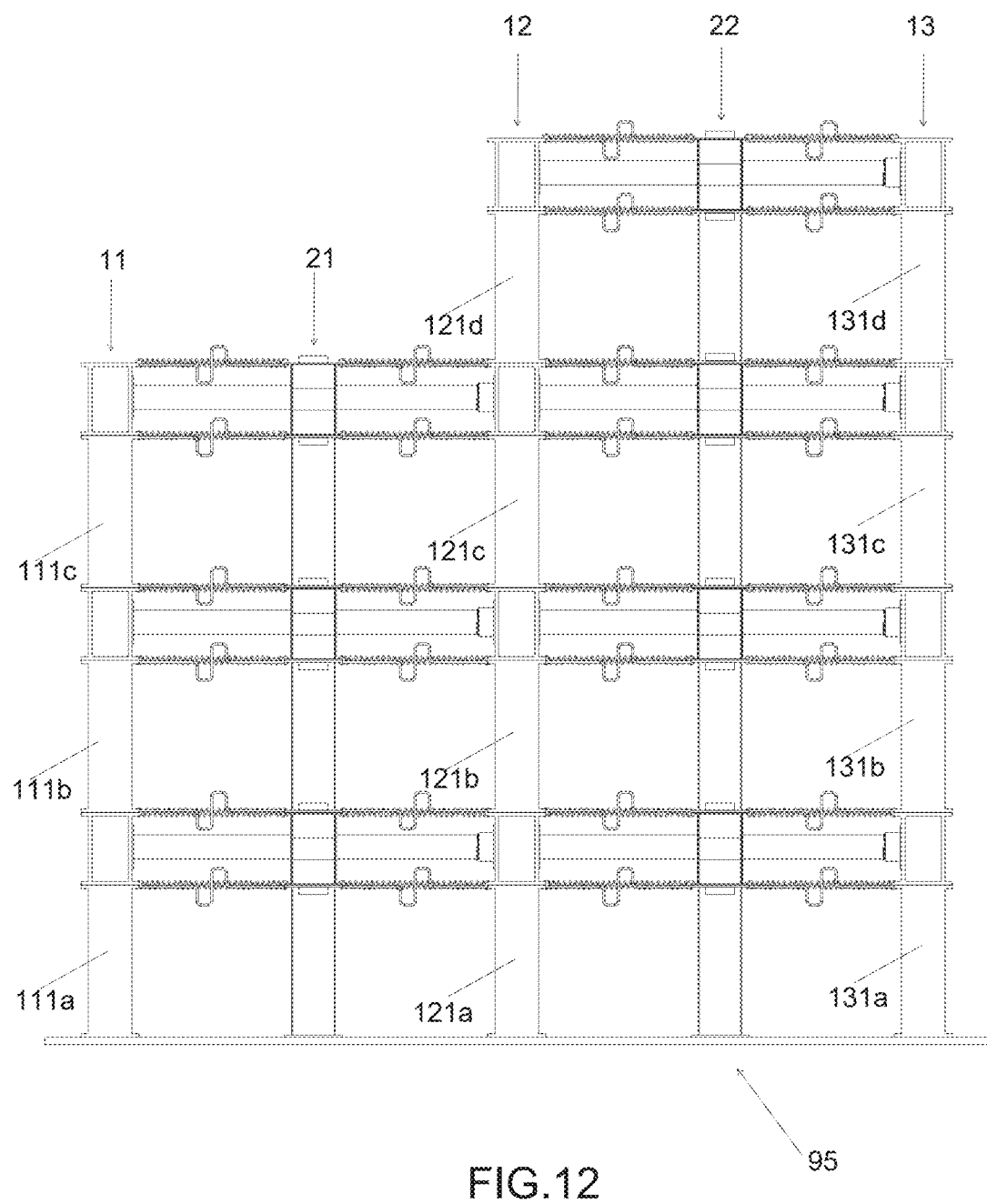
FIG. 12 is a schematic view of a CBEHD including rigid magnet-bearing beams.

By way of example, FIG. 12 schematically illustrates another exemplary embodiment of the coupled-beam energy harvesting damper, generally designated as CBEHD 95. In this configuration, the magnet-bearing beams 11, 12, and 13 are rigid and exhibit negligible deformation relative to coil-bearing beams 21 and 22. This effect results from the magnet-bearing beam units 111*a*-111*c*, 121*a*-121*d*, 131*a*-131*d* being intentionally designed as rigid structural members. By selectively rendering certain beam units rigid while permitting others to retain flexibility, the CBEHD provides a controllable balance of stiffness and compliance, thereby enabling tailored vibration responses and energy-harvesting performance.

In one or more embodiments, the CBEHD may be configured such that some or all of the coupling springs are selectively removed or disengaged. This spring-free configuration may be employed in cases where weak coupling between the coil-bearing beam and the magnet-bearing beams is advantageous. For example, when the external excitation power input is below the device's maximum harvesting and/or damping capability, the CBEHD may operate effectively without coupling springs.

Nevertheless, a spring-free configuration may also introduce limitations. Because no mechanical energy is exchanged between adjacent beams, the resonant beams may deform more readily, and the anti-collision cables may engage sooner than in spring-coupled designs. Such early engagement can result in partial energy loss, reducing the efficiency of conversion. Additionally, under conditions of high external excitation power, the absence of spring restraint may permit excessive vibration amplitudes, potentially undermining the structural stability, operational reliability, and service life of the energy harvesting damper.

As a general principle, when the input excitation power is relatively high, strong coupling springs are preferred to restrain excessive displacements and to maintain stable operation. Conversely, when the input excitation power is relatively low, weak springs or the omission of springs may be desirable to permit larger relative motions and to optimize energy harvesting and damping.

When the input excitation is relatively modest—specifically, below the designed energy harvesting or damping capacity of the CBEHD—the likelihood of collision or physical contact between a coil-bearing beam and its adjacent magnet-bearing beams is minimal. In such cases, the anti-collision cables may also be omitted or disengaged, further simplifying the structure and reducing component costs, while still enabling effective energy harvesting and/or damping performance.

Figure 13:
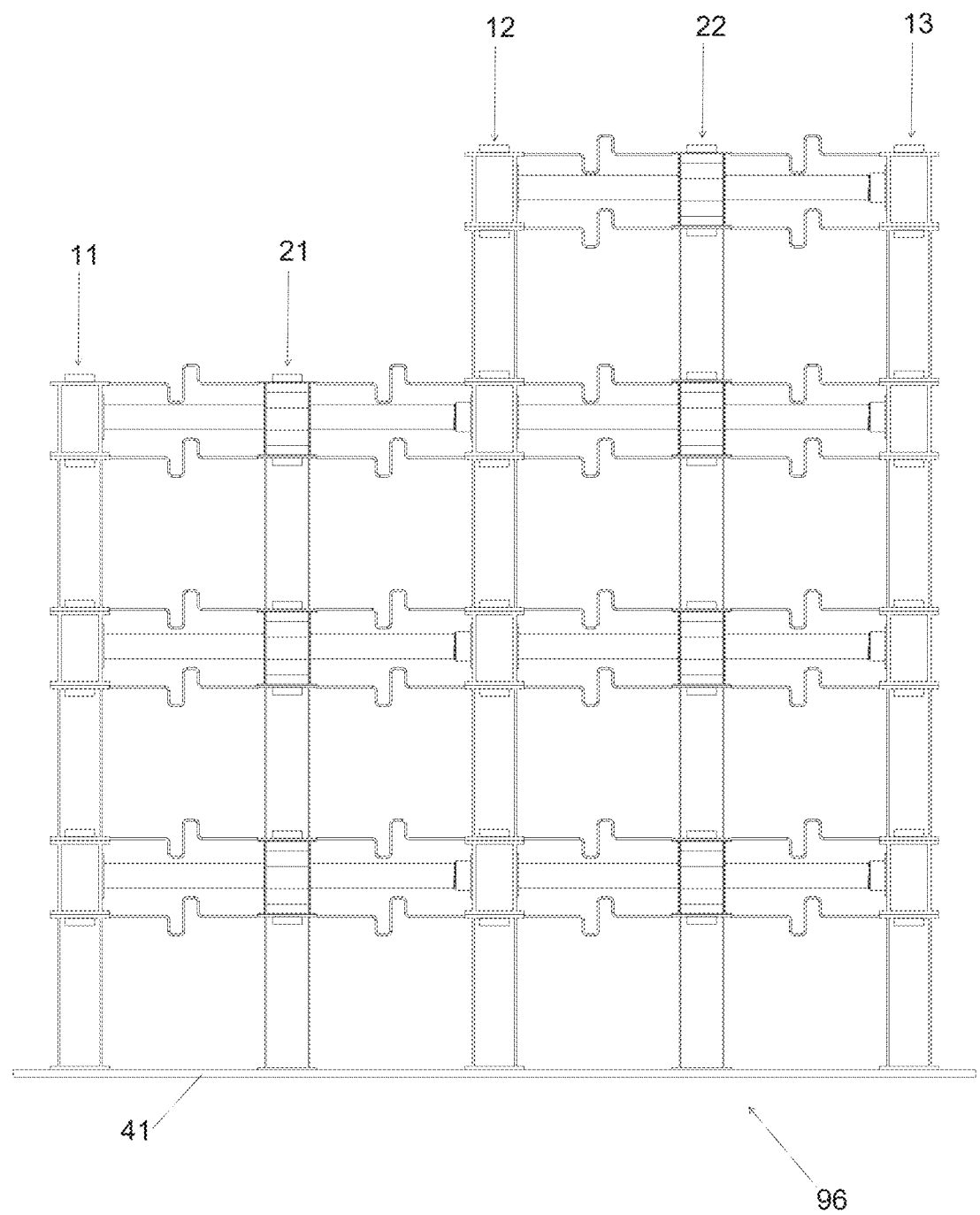
FIG. 13 is a schematic view of a CBEHD constructed without coupling springs.

By way of example, FIG. 13 illustrates an embodiment of the coupled-beam energy harvesting damper, generally designated as CBEHD 96, in which none of the coupling springs depicted in FIG. 1B are installed. The omission of springs provides several advantages. First, when the supporting structure is subjected to a given level of external excitation, the relative displacement between the coil-bearing beam and its adjacent magnet-bearing beams is amplified, since the beams are coupled only through electromagnetic interaction. Second, the natural frequencies of CBEHD 95 are determined solely by the intrinsic properties of the coil-bearing and magnet-bearing beams, independent of any spring coupling, which can simplify frequency prediction, tuning, and analytical modeling.

In one or more embodiments, the coupled-beam energy harvesting damper may be configured to engage not only with a primary base support structure but also with one or more auxiliary side support structures. These side supports can be operatively connected to the magnet-bearing beams through coupling springs and anti-collision cables, thereby providing additional stabilization and control of beam displacement. Such an arrangement advantageously enhances the stability of the overall device, particularly in regulating displacement along the longitudinal axis of the housing pipe, while simultaneously reducing undesirable lateral or torsional motion.

Figure 14:
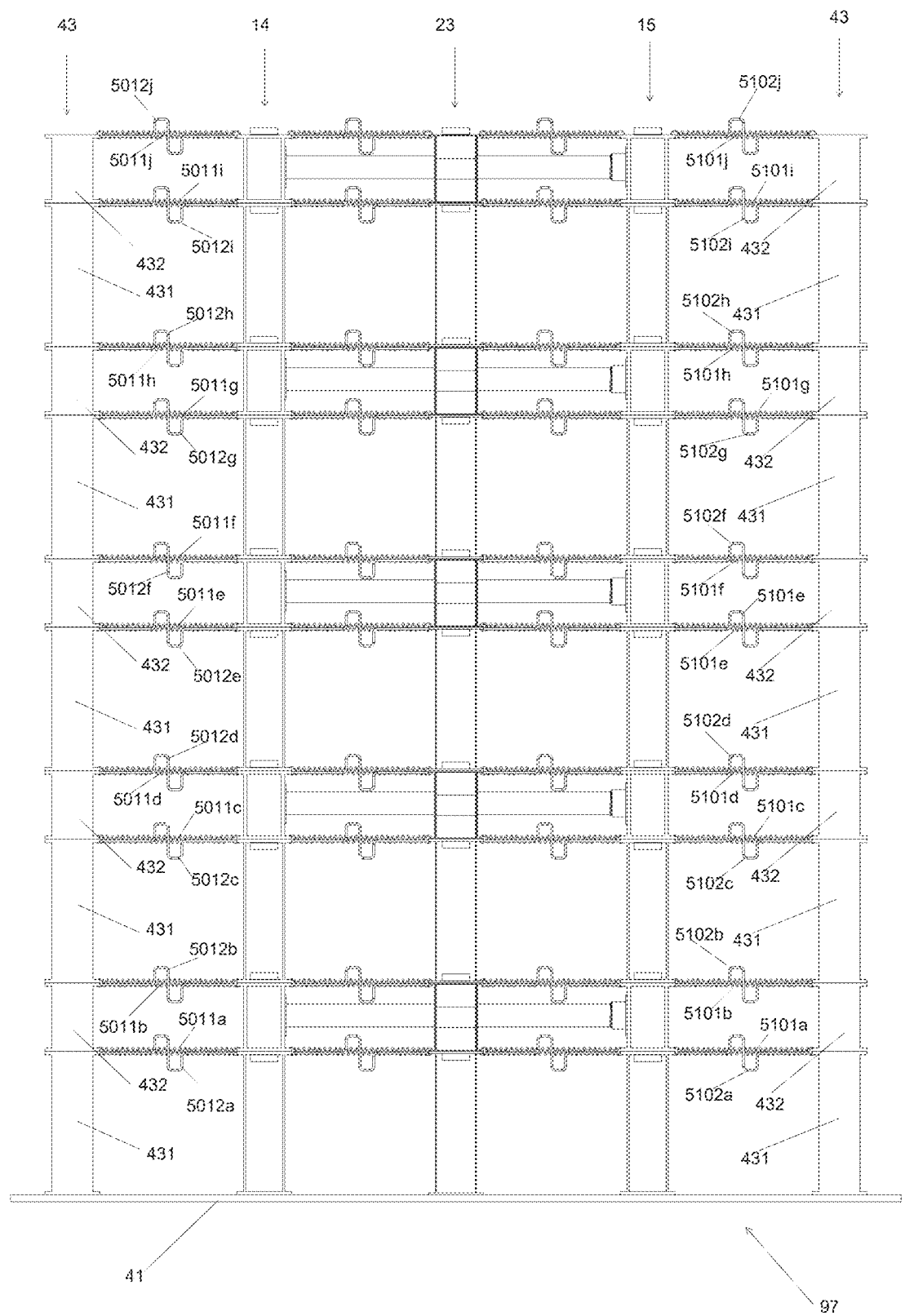
FIG. 14 is a schematic view of a CBEHD incorporating side support structures.

By way of illustration, FIG. 14 illustrates an exemplary embodiment of the coupled-beam energy harvesting damper, generally designated as CBEHD 97, which incorporates two side supports, designated as elements 43, in addition to the CBEHD in FIG. 10. Each of these side supports is mechanically joined to the base support structure 41, thereby forming an integrated support framework. Within each side support, a plurality of modular components is provided, including five support units 431 that are sequentially aligned and interconnected by five support connectors 432.

In the illustrated embodiment, one of the side supports 43 is coupled to magnet-bearing beams 14 by a series of coupling springs 5011*a*-5011*j* and corresponding anti-collision cables 5012*a*-5012*j*. Similarly, the same side support is coupled to magnet-bearing beams 15 through coupling springs 5101*a*-5101*j* and anti-collision cables 5102*a*-5102*j*. The combination of these elastic and restraining elements serves multiple purposes: the coupling springs provide tunable energy exchange and motion control between the beams and the side support, while the anti-collision cables limit excessive displacement, ensuring that structural integrity and coil-magnet alignment are preserved during high-energy excitations.

This side-supported configuration provides meaningful design flexibility. Depending on the operational environment, the stiffness of the coupling springs, and the geometry of the side support units may all be tailored to balance the competing objectives of stability, energy harvesting efficiency, and vibration mitigation. In certain implementations, the inclusion of side supports may be particularly advantageous in large-scale or high-intensity applications where maintaining controlled beam dynamics is critical to reliable energy conversion performance.

It should be further understood that the side supports need not be identical in configuration, nor are they limited to a single structural form. In many embodiments, the side supports are designed with relatively high stiffness so as to provide effective constraint and stability to the coupled-beam energy harvesting damper. However, their specific implementation may vary considerably depending on the design objectives and installation environment. For example, the side supports may be realized as elongated beams, rigid wall elements, truss frameworks, or other structural arrangements capable of providing the requisite stiffness and load transfer. Differences in shape, geometry, or material selection are also contemplated, allowing the supports to be fabricated from metals, composites, concrete, or other suitable structural materials. Such versatility in design ensures that the side support structure can be tailored to meet diverse performance requirements while maintaining robust coupling and reliable operation of the CBEHD.

Although the embodiments described above illustrate the CBEHD in a vertical orientation, configured to respond to translational vibration along the x-axis or rotational vibration about the z-axis (i.e., within the xy-plane), the invention is not limited to this orientation. The CBEHD may instead be installed in any orientation corresponding to one or more primary vibration modes of the adjoining object. In one or more embodiments, a plurality of CBEHDs may be attached to a host vibrating body, with each CBEHD independently oriented to align with a distinct direction of vibration.

Figure 15:
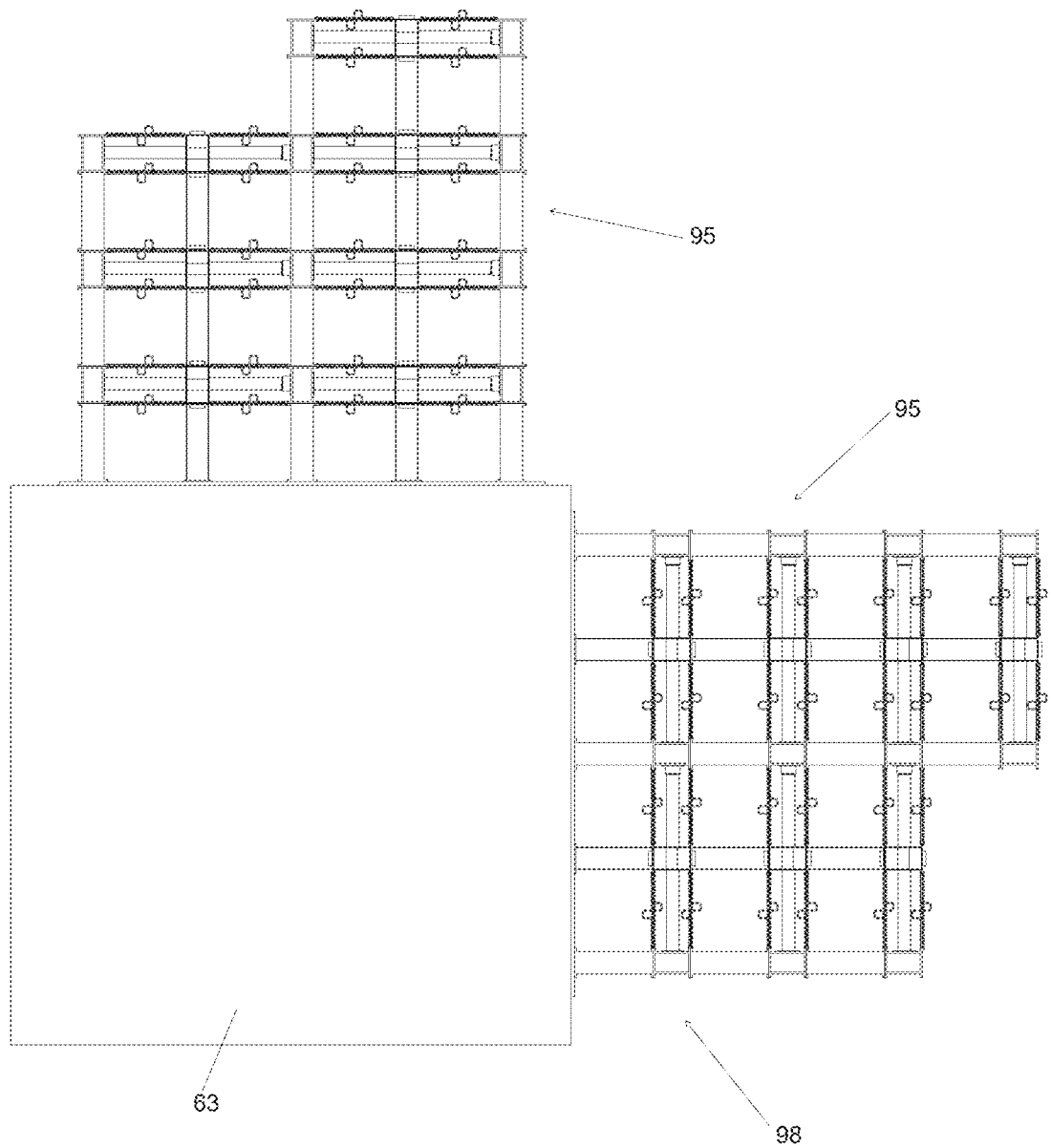
FIG. 15 is a schematic view of two CBEHDs arranged in different orientations to address multi-directional vibrations.

By way of illustration, FIG. 15 schematically depicts an exemplary embodiment, generally designated as element 98, in which one CBEHD 95 is arranged vertically and the other is arranged horizontally. When the host vibrating structure 63 undergoes vibrations in both horizontal and vertical directions, both CBEHDs 95 are excited. In still other embodiments, three or more CBEHDs may be coupled to the host vibrating object, with at least one unit aligned along each of the Cartesian coordinate axes—namely the x, y, and z directions—to address three-dimensional vibration fields. Such multi-directional arrangements facilitate more comprehensive control of vibratory response and more efficient utilization of ambient vibrational energy. In certain embodiments, the respective CBEHDs may be tuned to one or more natural frequencies. In addition, distinct frequency tuning of the individual units may further broaden the overall operational bandwidth of the system, thereby enabling energy harvesting and/or dissipation across multiple frequency bands.

In one or more embodiments, multiple coupled-beam energy harvesting dampers may be integrated within a dedicated container that serves as both a protective housing and a structural support. The container may be suspended in a fluid medium, such as air, where it is exposed to aerodynamic excitation. When subjected to wind-induced oscillations, the internal coupled-beam energy harvesting dampers undergo relative beam motion, causing the coils to generate EMF. In alternative deployments, the container may be positioned to float on the surface of a body of water. In such instances, incident waves produce vertical heave motions and side-to-side rolling or pitching of the container, which in turn excite the internal CBEHDs, again inducing an EMF within their coils. The container with multiple CBEHDs can also be mounted on or in a vibrating structure, such as bridges, buildings, machinery, or a floating device, to harvest energy and/or dissipate energy. These use cases are provided for illustration only, and the invention is not limited to these specific implementations.

Figure 16A:
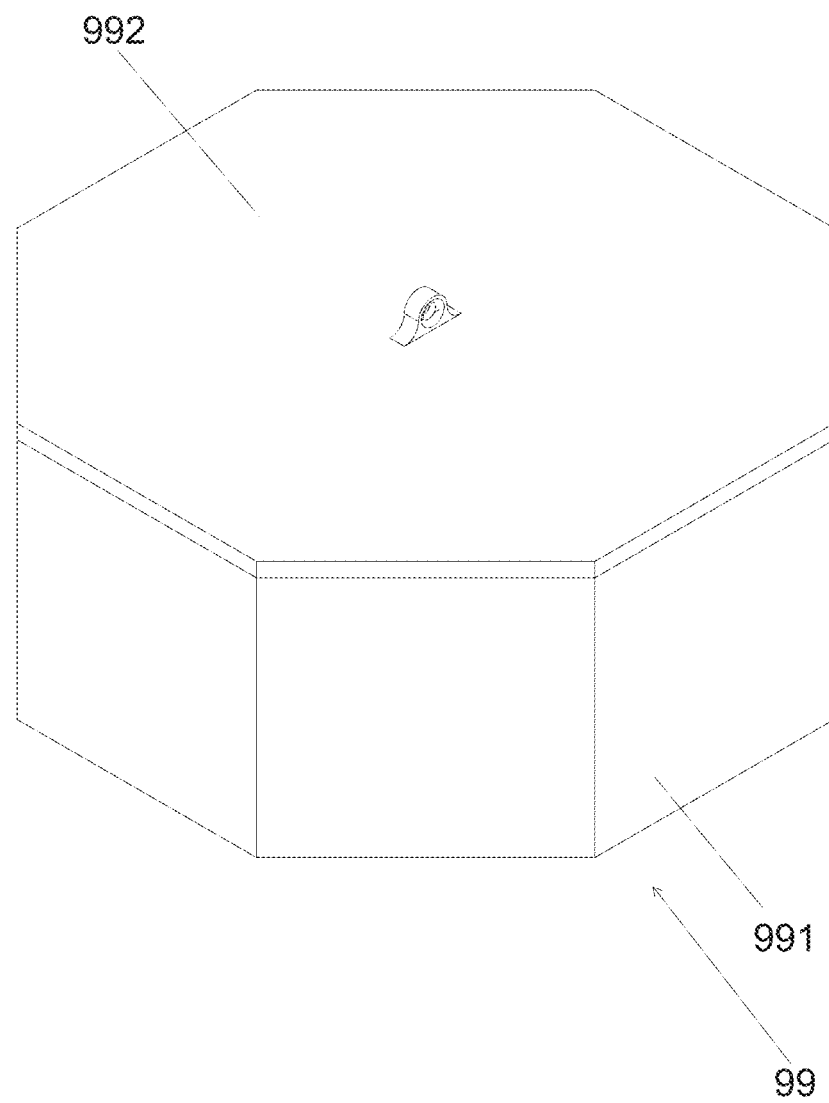
FIG. 16A is a schematic view of a containerized structure housing multiple CBEHD units for scalable deployment.
Figure 16B:
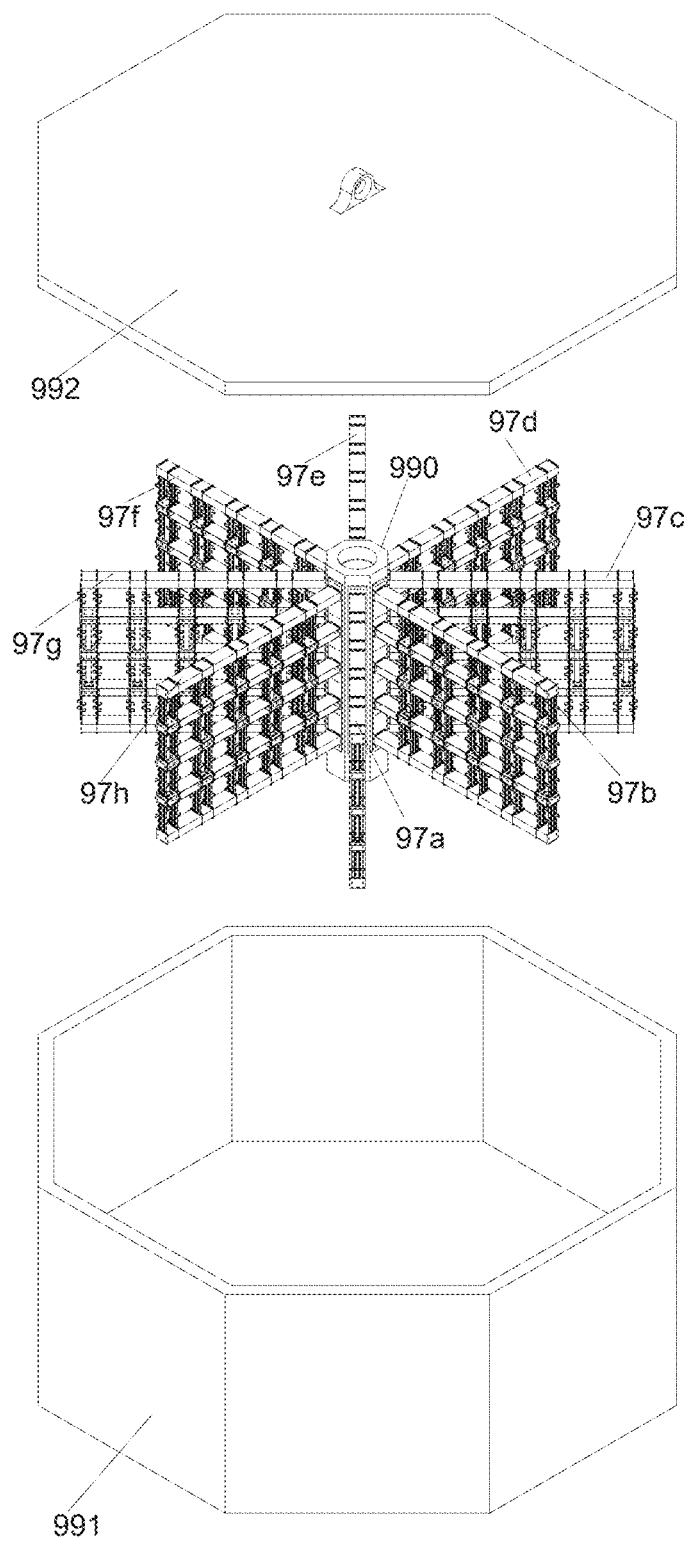
FIG. 16B is an exploded view of the container structure shown in FIG. 16A.

By way of illustration, FIGS. 16A-16B illustrate an exemplary embodiment of a container, generally designated as element 99. The container includes a container body 991 and a cover 992, both of which are mechanically joined to a central support structure 990. The central support structure provides a rigid framework that stabilizes and anchors the CBEHDs while maintaining proper geometric alignment during operation. Housed within the container body are eight coupled-beam energy harvesting dampers 97a-97h, each of which represents a variant of the baseline CBEHD 97 shown in FIG. 14. These eight CBEHD are arranged radially about the central support, ensuring efficient multi-directional energy capture.

In use, the container 99 may be deployed on the ocean surface. When the container body 991 is excited by wave-induced heave and/or roll, the beams within each of the eight coupled-beam energy harvesting dampers 97a-97h undergo dynamic relative displacements. This relative motion induces voltage across the coils.

The CBEHDs in container 99 may be individually tuned to one or more natural frequencies, including overlapping or distinct frequencies. For example, each CBEHD 97a-97h can be configured with a distinct natural frequency, thereby enabling the assembly to capture energy across a wide band of excitation frequencies. One effective approach to achieving such a broad frequency spectrum involves incrementally varying the tuning masses associated with the CBEHDs 97a-97h. For example, by progressively increasing the tuning masses from CBEHDs 97a through CBEHDs 97h, a staggered frequency distribution can be realized. Such tuning, in combination with adjustments to beam stiffness, geometry, material, and coupling spring stiffness, ensures that the containerized system maintains high conversion efficiency across diverse environmental conditions. It should be understood that the foregoing orientations and frequency configurations are exemplary in nature and not limiting of the scope of the invention.

The embodiments of the CBEHD disclosed herein demonstrate a versatile and robust structural configuration capable of operating across multiple frequency bands. By providing beam structures of varying stiffnesses, masses, and coupling characteristics, and by permitting selective adjustment of design parameters such as beam length, beam stiffness, beam material, beam boundary conditions, coupling-spring stiffness, magnet weight, magnet placement, coil weight, coil placement, tuning-mass weight, tuning-mass placement, or another parameter recognized in the art as influencing structural vibration characteristics, the CBEHD may be tuned to resonate at multiple natural frequencies. Such tunability enables broadband vibrational energy harvesting and/or damping, offering substantial advantages in environments characterized by variable or multi-modal excitations, including, without limitation, ocean waves, wind-induced vibrations, and mechanical or structural vibrations.

In contrast with conventional energy harvesters and dampers that rely on gear trains, rotary shafts, or other intermediate mechanical components, the disclosed CBEHD achieves frictionless electromechanical conversion through flexural deformation of beam members and relative displacement between magnet-bearing and coil-bearing beams. This architecture dispenses with gears and similar mechanisms, thereby reducing structural complexity, minimizing frictional losses, lowering maintenance requirements, and enhancing long-term durability in both fluidic and non-fluidic operational environments.

Furthermore, the disclosed embodiments are not limited to a singular operational role. Depending on the electrical connection of the coils and the desired application, the CBEHD may function as an energy harvester, as a vibration damper, or as a hybrid device simultaneously performing both functions. This dual-capability design extends its applicability across diverse domains, including renewable energy capture, vibration mitigation, and multifunctional structural integration.

It will be understood by those of ordinary skill in the art that the foregoing description is intended to be illustrative rather than limiting. Variations, substitutions, and modifications may be made to the structures and methods described herein without departing from the spirit and scope of the invention, which is defined solely by the appended claims and their legal equivalents.

The invention claimed is:

1. A coupled-beam energy harvesting damper (CBEHD), comprising:
    (a) a support structure configured to be secured to a host vibrating body, the support structure being either a distinct member or a portion of the host body;
    (b) at least two magnet-bearing beams extending from the support structure, each magnet-bearing beam comprising a beam formed as a continuous unitary member or as a modular assembly including one or more beam units joined by one or more connectors;
    (c) at least one coil-bearing beam extending from the support structure and disposed between the magnet-bearing beams, the coil-bearing beam comprising a beam formed as a continuous unitary member or as a modular assembly including one or more beam units joined by one or more connectors;
    (d) at least one electrical coil wound about a coil spool secured to the coil-bearing beam; and
    (e) at least one magnet assembly spanning between adjacent magnet-bearing beams and extending through a bore of at least one coil spool, the coil spool having at least one electrical coil wound thereabout, the magnet assembly comprising at least one permanent magnet retained within a housing pipe;
    wherein relative displacement between the coil-bearing beam and the magnet-bearing beams induces an electromotive force in the at least one electrical coil.

2. The CBEHD of claim 1, further comprising one or more of the following components, in any combination:
    (a) one or more coupling springs disposed between the coil-bearing beam and an adjacent magnet-bearing beam;
    (b) one or more anti-collision cables disposed between the coil-bearing beam and an adjacent magnet-bearing beam;
    (c) one or more tuning masses mounted to at least one beam; and
    (d) at least one auxiliary side-support structure operatively coupled to one or more of the magnet-bearing beams via coupling springs, anti-collision cables, or both;
    wherein the components, individually or in combination, are configured to achieve one or more of the following: regulating relative displacement between the coil-bearing and magnet-bearing beams, modifying one or more natural frequencies, suppressing excessive vibration amplitudes to prevent structural over-travel, and maintaining alignment and stability of the beams under varied excitation conditions.

3. The CBEHD of claim 2, wherein, when modular construction is employed, the beam units and connectors are arranged in a sequence selected from the group consisting of:
    (a) two or more beam units joined directly together;
    (b) two or more connectors joined directly together;
    (c) an alternating series of beam units and connectors; and
    (d) combinations thereof.

4. The CBEHD of claim 2, wherein each of the coil-bearing beam and the magnet-bearing beams is configured such that its longitudinal stiffness associated with deformation along the longitudinal axis of the housing pipe is less than its transverse stiffness associated with deformation along a transverse axis thereof.

5. The CBEHD of claim 2, wherein the housing pipe is fabricated from a substantially non-magnetic material and the coil spool is fabricated from a substantially non-magnetic and electrically non-conductive material.

6. The CBEHD of claim 2, wherein the beams are configured to have a uniform length.

7. The CBEHD of claim 2, wherein the beams are configured to have deliberately non-uniform lengths to provide a tailored stiffness distribution and customized frequency-tuning characteristics.

8. The CBEHD of claim 2, wherein the coil spool and the housing pipe are dimensioned and arranged to provide a clearance sufficient to substantially prevent physical contact therebetween during operational vibrations, thereby reducing mechanical wear and preserving electromagnetic performance.

9. The CBEHD of claim 8, wherein the coil spool and the housing pipe are dimensioned to provide a greater clearance in a longitudinal direction of the beams and a smaller clearance in a lateral direction, thereby permitting relative displacement along the longitudinal axis of the housing pipe and enhancing electromagnetic coupling between the coil and the magnet.

10. The CBEHD of claim 2, wherein at least one beam, formed either as a continuous unitary member or as a modular assembly including one or more beam units joined by one or more connectors, comprises:
    (a) a profile formed as a multi-I configuration comprising two or more I-shaped profiles arranged in parallel;
    (b) a depth of the beam or beam unit that is greater than a width of the beam or beam unit; and
    (c) a flange portion having a thickness greater than that of a web portion;
    wherein the structural configuration imparts greater transverse stiffness than longitudinal stiffness and permits relative displacement between the coil spool and the housing pipe of a magnitude sufficient to accommodate operational vibrations without interference.

11. The CBEHD of claim 2, wherein:
    (a) at least one of the coil-bearing beams or the magnet-bearing beams is formed as a rigid member exhibiting negligible deformation relative to an adjacent flexible beam; and
    (b) at least two directly adjacent beams are not both rigid;
    whereby the rigid member being further configured to limit overall deformation of the CBEHD under strong excitation and to amplify relative displacement of an adjacent flexible beam.

12. The CBEHD of claim 2, wherein the relative arrangement of the coils and magnets is reversed, comprising:
    (a) one or more electrical coils disposed within a housing pipe supported by the magnet-bearing beams; and
    (b) at least one permanent magnet mounted on a coil-bearing beam and dimensioned to permit passage of the housing pipe, the permanent magnet being ring-shaped;
    wherein the functional roles of the coil-bearing beam and the magnet-bearing beams, as well as the coil spool and the magnet assembly, are interchanged to provide alternative coil-in-beam and magnet-on-beam configurations.

13. The CBEHD of claim 2, wherein the device is operable in a mode selected from the group consisting of:

(a) harvesting electrical energy from relative motion between the beams;
(b) dissipating vibrational energy to provide damping; and
(c) concurrently harvesting electrical energy and dissipating vibrational energy.

14. The CBEHD of claim 2, wherein, when anti-collision cables are provided, the cables are dimensioned and arranged to restrict relative displacement between the coil-bearing beam and the magnet-bearing beams, thereby preventing physical contact between the beams and avoiding interference between the coil spools and the housing pipes during operation.

15. A system for vibrational energy harvesting, damping, or both, comprising:
(a) a plurality of CBEHDs according to claim 2, the plurality of CBEHDs being arranged in an array or incorporated within a container structure; and
(b) the plurality of CBEHDs being selectively oriented in one or more directions and individually tuned to one or more natural frequencies, the natural frequencies including overlapping or distinct frequencies.

16. A method of tuning a CBEHD, the method comprising:
(a) providing a CBEHD as recited in claim 2;
(b) adjusting at least one structural parameter of the CBEHD, the structural parameter comprising at least one of beam length, beam stiffness, beam material, beam boundary conditions, coupling-spring stiffness, magnet weight, magnet placement, coil weight, coil placement, tuning-mass weight, and tuning-mass placement; and
(c) thereby modifying at least one vibrational characteristic of the CBEHD, including but not limited to a natural frequency or a mode shape.

17. The method of claim 16, wherein adjusting the structural parameter comprises modifying an effective coupling-spring stiffness of the CBEHD by preloading a coupling spring, substituting the coupling spring with another spring of different stiffness, or otherwise altering spring characteristics.

18. The method of claim 16, wherein adjusting the structural parameter comprises selectively modifying a weight of at least one tuning mass of the CBEHD to fine-tune a natural frequency and dynamic-response characteristics of the device.

* * * * *